(12) United States Patent
Cronin et al.

(10) Patent No.: US 9,528,904 B1
(45) Date of Patent: Dec. 27, 2016

(54) POSITIVE DISPLACEMENT METERING SYSTEM

(71) Applicants: William C. Cronin, Irvine, CA (US); John V. Cronin, Newport Beach, CA (US)

(72) Inventors: William C. Cronin, Irvine, CA (US); John V. Cronin, Newport Beach, CA (US)

( * ) Notice: Subject to any disclaimer, the term of this patent is extended or adjusted under 35 U.S.C. 154(b) by 0 days.

(21) Appl. No.: 14/834,337

(22) Filed: Aug. 24, 2015

(51) Int. Cl.
*G01M 3/30* (2006.01)
*E03B 7/07* (2006.01)
*G01F 7/00* (2006.01)

(52) U.S. Cl.
CPC ............... *G01M 3/30* (2013.01); *E03B 7/072* (2013.01); *G01F 7/00* (2013.01)

(58) Field of Classification Search
CPC .............. G01M 3/30; G01F 7/00; E03B 7/072
See application file for complete search history.

(56) References Cited

U.S. PATENT DOCUMENTS

| | | | | |
|---|---|---|---|---|
| 5,056,554 | A * | 10/1991 | White | E03B 7/12 137/312 |
| 5,228,469 | A * | 7/1993 | Otten | A01G 25/16 137/466 |
| 6,186,162 | B1 | 2/2001 | Purvis et al. | |
| 2014/0246364 | A1 * | 9/2014 | Hruska | C01B 13/11 210/143 |

OTHER PUBLICATIONS

DYNAQUIP, WaterCop Automatic Water Shut-Off Systems home page (website), Retrieved from the Internet as early as Sep. 2, 2016, <URL:http://www.watercop.com/>.
DYNAQUIP, WaterCop Automatic Water Shut-Off Systems: Overview (website), Retrieved from the Internet as early as Sep. 2, 2016, <URL: http://www.watercop.com/overview.aspx>.
DYNAQUIP, WaterCop Automatic Water Shut-Off Systems: Purchase (website), Retrieved from the Internet as early as Sep. 2, 2016, <URL:http://www.watercop.com/Purchase/tabid/57/List/1/CategoryID/1/Level/a/Defaultaspx?SortField=DateCreated,ProductName>.

(Continued)

*Primary Examiner* — Hezron E Williams
*Assistant Examiner* — David Z Huang
(74) *Attorney, Agent, or Firm* — Stetina Brunda Garred & Brucker

(57) ABSTRACT

A Positive Displacement Metering Systems (PDMS) using a Water Fill Cylinder (WFC) is provided. It will replace or be paired with an existing conventional water meter. The primary advantage of the PDMS is its ability to detect and measure "micro" flow rates. The PDMS allows the water utility to bill for all water consumed by the customer. The PDMS will only allow 100% detectable flow rates to pass through the water meter attached. Flow rates which are undetectable, or only partially detectable will be accounted for. The PDMS will report the sum of the two meters to the utility. The PDMS will also function as a leak detection device and water conservation tool, will perform automatic or remotely controlled functions like turning off water, when a high flow leak is detected, and report directly to the water utility or tenant of the property being monitored.

9 Claims, 14 Drawing Sheets

(56) References Cited

OTHER PUBLICATIONS

FloLogic, Inc., FloLogic home pages (website), Retrieved from the Internet as early as Sep. 2, 2016, <URL:http://www.flologic.com/>.
FloLogic, Inc., FloLogic: How It Works (website), Retrieved from the Internet as early as Sep. 2, 2016, <URL:http://www.flologic.com/HowItWorks.html>.
FloLogic, Inc., FloLogic: Documentation (website), Retrieved from the Internet as early as Sep. 2, 2016, <URL:http://www.flologic.com/Documentation.htmll>.
FloLogic, Inc., FloLogic System 3.0 Feature Specification for systems purchased in 2012 and later (brochure), Retrieved from the Internet as early as Sep. 2, 2016.
FloLogic, Inc., FloLogic System 3.0 Users Manual Rev. 2012 (manual), Retrieved from the Internet as early as Sep. 2, 2016.
FloLogic, Inc., FloLogic System 3.0 Installation and Set-up Insturctions Ver. 2.0 (manual), Retrieved from the Internet as early as Sep. 2, 2016.
FloLogic, Inc., FloLogic System 3.0 Warranty (pamphlet), Retrieved from the Internet as early as Sep. 2, 2016.
FloLogic, Inc., FloLogic System 3.0 Users Manual Rev. 3 (manual), Retrieved from the Internet as early as Sep. 2, 2016.
FloLogic, Inc., FloLogic System 3.0 Installation and Set-up Insturctions Ver. 1-14 (manual), Retrieved from the Internet as early as Sep. 2, 2016.
FloLogic, Inc., FloLogic System 3.5 Users Manual May 2015 (manual), Retrieved from the Internet as early as Sep. 2, 2016.
FloLogic, Inc., FloLogic System 3.5 Installation and Set-up Instructions V. 3.1 (manual), Retrieved from the Internet as early as Sep. 2, 2016.
FloLogic, Inc., FloLogic System 3.5 Cut Sheet Jul. 2015 (pamphlet), Retrieved from the Internet as early as Sep. 2, 2016.
Leak Defense Systems, home page (website), Retrieved from the Internet as early as Sep. 2, 2016, <URL:http://leakdefensesystem.com/>.
509SMILEY, "LDS demo" video on YouTube (website), Published Sep. 17, 2013, Retrieved from the Internet as early as Sep. 2, 2016, <URL:https://www.youtube.com/watch?v=pFobmmngB9Y>.
Me S, "LDS Installation" video on YouTube (website), Published Sep. 25, 2015, Retrieved from the Internet as early as Sep. 2, 2016, <URL:https://www.youtube.com/watch?v=5993Qcc-Aa>.
Scott Pallais, "Water Security" video on YouTube (website), Published Mar. 6, 2013, Retrieved from the Internet as early as Sep. 2, 2016, <URL:https://www.youtube.com/watch?v=tra5wAcqQrg>.
Scott Pallais, "Find Out How to Prevent the Most Likely Cause of Damage to Your Home!" video on YouTube (website), Published Mar. 6, 2013, Retrieved from the Internet as early as Sep. 2, 2016, <URL:https://www.youtube.com/watch?v=XzmiWMbYoi8>.
Leak Defense Systems, Informational Downloads (website), Retrieved from the Internet as early as Sep. 2, 2016, <URL:http://leakdefensesystem.com/informational-downloads/>.
Leak Defense Systems, Pre-Installation Property Assessment (pamphlet), Retrieved from the Internet as early as Sep. 2, 2016.
Leak Defense Systems, Installation Guide for Wired Leak Defense System (manual), Retrieved from the Internet as early as Sep. 2, 2016.
Leak Defense Systems, Installation Guide for Wireless Leak Defense System (manual), Retrieved from the Internet as early as Sep. 2, 2016.
Leak Defense Systems, Owner's Manual for Wired Leak Defense System (manual), Retrieved from the Internet as early as Sep. 2, 2016.
Leak Defense Systems, Leak Defense System Specification Sheet (pamphlet), Retrieved from the Internet as early as Sep. 2, 2016.
Leak Defense Systems, Leak Defense System Information Sheet (pamphlet), Retrieved from the Internet as early as Sep. 2, 2016.
Leak Defense Systems, Auxiliary Flow Checklist (pamphlet), Retrieved from the Internet as early as Sep. 2, 2016.
Leak Defense Systems, Sporadic Flow Checklist (pamphlet), Retrieved from the Internet as early as Sep. 2, 2016.
Leak Defense Systems, Point of Leak Detection Kit (pamphlet), Retrieved from the Internet as early as Sep. 2, 2016.
Leak Defense Systems, Wireless Transmitter (pamphlet), Retrieved from the Internet as early as Sep. 2, 2016.
Leak Defense Systems, Point of Leak Sensor (pamphlet), Retrieved from the Internet as early as Sep. 2, 2016.
Leak Defense Systems, POLD Transmitter (pamphlet), Retrieved from the Internet as early as Sep. 2, 2016.
Leak Defense Systems, POLS Investigating Triggered Alarm (pamphlet), Retrieved from the Internet as early as Sep. 2, 2016.
Leak Defense Systems, Leak Defense Commonly Asked Questions (pamphlet), Retrieved from the Internet as early as Sep. 2, 2016.
Reliance Detection Technologies, LLC, FloodMaster (website), Retrieved from the Internet as early as Sep. 2, 2016, <URL:http://www.floodmaster.com/#prettyPhoto>.
Reliance Detection Technologies, LLC, FloodMaster: How FloodMaster Works (website), Retrieved from the Internet as early as Sep. 2, 2016, <URL:http://www.floodmaster.com/how-floodmaster-works.php>.
Reliance Detection Technologies, LLC, FloodMaster: Automatic Water Leak Detection & Appliance Shut-Off Systems (website), Retrieved from the Internet as early as Sep. 2, 2016, <URL:http://www.floodmaster.com/products/leak-detection-alarm-appliance-shutoff.php>.
Reliance Detection Technologies, LLC, FloodMaster: Plumbing Leak Protection & Water Main Shut-Off Systems (website), Retrieved from the Internet as early as Sep. 2, 2016, <URL:http://www.floodmaster.com/products/water-main-leak-detection-shutoff.php>.
Reliance Detection Technologies, LLC, FloodMaster: Sensing Rope Accessory Kit (website), Retrieved from the internet as early as Sep. 2, 2016, <URL:http://www.floodmaster.com/products/sensing-rope.php>.
Reliance Detection Technologies, LLC, FloodMaster: Auto Dialer Accessory Kit (website), Retrieved from the Internet as early as Sep. 2, 2016, <URL:http://www.floodmaster.com/products/auto-dialer.php>.
Reliance Detection Technologies, LLC, FloodMaster: Installation Information (website), Retrieved from the Internet as early as Sep. 2, 2016, <URL:http://www.floodmaster.com/support/installation.php>.
FloodMaster, FloodMaster Leak Detection System (brochure), Retrieved from the Internet as early as Sep. 2, 2016.
FloodMaster, RS-080 Leak Alarm/Total Water Main Shut-Off System (manual), Retrieved from the Internet as early as Sep. 2, 2016.
FloodMaster, RS-090 Washing Machine Leak Alarm/Shut-Off System (manual), Retrieved from the Internet as early as Sep. 2, 2016.
FloodMaster, RS-094 Hot Water Heater Leak Alarm/Shut-Off System (manual), Retrieved from the Internet as early as Sep. 2, 2016.
FloodMaster, RS-095 Battery Operated Water Leak Alarm (manual), Retrieved from the Internet as early as Sep. 2, 2016.
FloodMaster, RS-096 Plug-In Water Leak Alarm (manual), Retrieved from the Internet as early as Sep. 2, 2016.
FloodMaster, RS-097 HVAC/Air Conditioner Condensate Leak Detector (manual), Retrieved from the Internet as early as Sep. 2, 2016.
FloodMaster, Auto Dialer Accessory Kit (manual), Retrieved from the Internet as early as Sep. 2, 2016.
FloodMaster, Sensing Rope Accessory Kit (manual), Retrieved from the Internet as early as Sep. 2, 2016.
FloodMaster, Electrical Wiring Schematics for RS-080, RS-090, RS-094, RS-096, RS-097 Dry Signal Contact Wiring to a Plug-In Relay or Hard-Wired Relay (pamphlet), Retrieved from the Internet as early as Sep. 2, 2016.
FloodMaster, Electrical Wiring Schematics for RS-360 (pamphlet), Retrieved from the Internet as early as Sep. 2, 2016.
FloodMaster, FM-080 Leak Alarm/Total Water Main Shut-Off System (manual), Retrieved from the Internet as early as Sep. 2, 2016.
FloodMaster, FM-090 Washing Machine Leak Alarm/Shut-Off System (manual), Retrieved from the Internet as early as Sep. 2, 2016.
FloodMaster, FM-094 Hot Water Heater Leak Alarm/Shut-Off System (manual), Retrieved from the Internet as early as Sep. 2, 2016.

(56) References Cited

OTHER PUBLICATIONS

FloodMaster, FM-095 Battery Operated Water Leak Alarm (manual), Retrieved from the Internet as early as Sep. 2, 2016.
FloodMaster, FM-096 Plug-In Water Leak Alarm (manual), Retrieved from the Internet as early as Sep. 2, 2016.
FloodMaster, FM-097 HVAC/Air Conditioner Condensate Leak Detector (manual), Retrieved from the Internet as early as Sep. 2, 2016.
FloodMaster, FM-180 Wireless Leak Alarm/Total Water Main Shut-Off System (manual), Retrieved from the Internet as early as Sep. 2, 2016.
FloodMaster, FM-190 Wireless Washing Machine Leak Alarm/Shut-Off System (manual), Retrieved from the Internet as early as Sep. 2, 2016.
FloodMaster, FM-194 Wireless Washing Machine Leak Alarm/Shut-Off System (manual), Retrieved from the Internet as early as Sep. 2, 2016.
FloodMaster, FM-196 Wireless Water Leak Alarm (manual), Retrieved from the Internet as early as Sep. 2, 2016.
FloodMaster, FM-196 ZC Zone Control Water Leak Alarm System (manual), Retrieved from the Internet as early as Sep. 2, 2016.
FloodMaster, Fm-197 Wireless HVAC/Air Conditioner Condensate Leak Detector (manual), Retrieved from the Internet 3s early as Sep. 2, 2016.
Leak Defense Systems, Owner's Manual for Wireless Leak Defense System (manual), Retrieved from the Internet as early as Sep. 2, 2016.

\* cited by examiner

| Sequence of Events -1<br>Evaluation Mode / Leak Mode Interrupted by Standard Use<br>Home Mode (30 min)<br>T1 Time < 30 Seconds | Piston Position | Valve Position | Water Meter | Water flow | Action |
| --- | --- | --- | --- | --- | --- |
| Evaluation Mode No Leak | Home (A1) | Closed | Off | None | System is in Equilibrium, water is not flowing and the piston is stationary |
| Leak Begin | Between A1 and S1 | Closed | Off | Slow Flow Into WFC | Piston Displaced off A1 and moving towards S1 |
| Piston Reaches S1 | S1 | Closed | Off | Slow Flow Into WFC | S1 is reached, T1 time begins |
| High Water Use Event Starts | Between S1 and S2 | Closed | Off | Fast Flow Into WFC | Piston is rapidly moving toward S2 |
| Piston Reaches S2 | S2 | Open | On | Through PV | S2 is reached. T1 time ends and indicates Standard Use. PV opens and T2 time begins. |
| Piston Transitions to A1 | Between S2 Moving to A1 | Open | On | Through PV | PV open, piston in transition back to A1 |
| Piston Reaches A1 | A1 | Open | On | Through PV | Piston stationary in A1 position. T2 time continues to count (Home Mode 30 Min) |
| High Water Use Event Ends | A1 | Open | On | Through PV | Flow Meter detects X-Flow value less than X |
| Flow Meter Commands PV Closed | A1 | Closed | Off | Slow Flow Into WFC | Piston displaced off A1 and moving towards S1 due to origonal leak. Evaluation node begins over from start. |

FIG. 10

| Sequence of Events -2 Evaluation Mode / Standard Use Resulting in Alarm Mode Away Mode Selected (2 min) | Piston Position | Valve Position | Water Meter | Water flow | Action |
|---|---|---|---|---|---|
| Evaluation Mode No Leak | Home (A1) | Closed | Off | None | System is in Equilibrium, water is not flowing and the piston is stationary |
| Water Hose Burst, Resulting in Large Leak | Between A1 and S1 | Closed | Off | Fast Flow Into WFC | Piston Displaced off A1 and moving rapidly towards S1 |
| Piston Reaches S1 | S1 | Closed | Off | Fast Flow Into WFC | S1 is reached, T1 time begins |
| Piston Reaches S2 | S2 | Open | On | Through PV | S2 is reached. T1 time ends and indicates Standard Use water Flow. The PV opens and T2 (Away 2 min time) begins. |
| Piston Transitions to A1 | Between S2 and A1 | Open | On | Through PV | PV open, piston in transition back to A1 |
| Piston Reaches A1 | A1 | Open | On | Through PV | Piston stationary in A1 position. 2 min time continues to count down. |
| 2 Min Time Expires / Alarm Logic Begins | Between A1 and S1 | Closed | Off | Fast Flow Into WFC | Piston displaced off A1 and moving rapidly towards the end of the cylinder. |
| Piston Reaches End of Travel | Cycle End | Closed | Off | None | 2 Min Away Time has expired, Standard Use Logic has transitioned to Alarm Logic. PV closed, water flow stopped, LAS interface advises responsible party. |

FIG. 11

| Sequence of Events -3 Evaluation Mode / Leak Mode Interrupted by Standard Use Home Mode (30 min) T1 time > 30 Seconds Over-Ride Sensor in Play | Piston Position | Valve Position | Water Meter | Water flow | Action |
|---|---|---|---|---|---|
| Evaluation Mode No Leak | Home (A1) | Closed | Off | None | System is in Equilibrium, water is not flowing and the piston is stationary |
| Leak Begin | Between A1 and S1 | Closed | Off | Slow Flow Into WFC | Piston Displaced off A1 and moving towards S1 |
| Piston Reaches S1 | S1 | Closed | Off | Slow Flow Into WFC | S1 is reached, T1 time begins |
| High Water Use Event Starts | Between S1 and OR1 | Closed | Off | Fast Flow Into WFC | Piston is rapidly moving toward S2 |
| Piston Reaches OR1 | OR1 | Closed | Off | Fast Flow Into WFC | OR1 Time starts |
| Piston Reaches S2 | S2 | Open | On | Through PV | OR1 Time is less than 2 seconds. T1 time is overridden by OR1 time and Standard Use Logic is assigned to the event. T2 Time starts. |
| Piston Transitions to A1 | Between S2 Moving to A1 | Open | On | Through PV | PV open, piston in transition back to A1 |
| Piston Reaches A1 | A1 | Open | On | Through PV | Piston stationary in A1 position. T2 time continues to count (Home Mode 30 Min) |
| High Water Use Event Ends | A1 | Open | On | Through PV | Flow Meter detects X-Flow value less than X |
| Flow Meter commands PV closed | A1 | Closed | Off | Slow Flow Into WFC | Piston displaced off A1 and moving towards S1. Evaluation mode begins over from start. |

FIG. 12

Sequence of Events -4

| Evaluation Mode / Leak Mode Resulting in Alarm Mode | Piston Position | Valve Position | Water Meter | Water flow | Action |
|---|---|---|---|---|---|
| Evaluation Mode No Leak | Home (A1) | Closed | Off | None | System is in equilibrium, water is not flowing and the piston is stationary |
| Leak Begin | Between A1 and S1 | Closed | Off | Slow Flow Into WFC | Piston Displaced off A1 and moving towards S1 |
| Piston Reaches S1 | S1 | Closed | Off | Slow Flow Into WFC | S1 is reached, T1 time begins |
| Piston Reaches S2 | S2 | Open | On | Through PV | S2 is reached. T1 time ends and indicates a leak. PV opens for 5 sec and piston resets to A1. 1 cycle is counted. |
| Piston Transitions to A1 | Between S2 Moving to A1 | Open | On | Through PV | PV open, piston in transition back to A1 |
| 5 Second Time Ends | A1 | Closed | Off | Slow Flow Into WFC | Piston displaced off A1 and moving towards S1. 2nd cycle begins. |
| - Cycle Repeats, Begin Sequence of Events at End of 3rd Cycle - | | | | | |
| Piston Reaches S2 | S2 | Closed | Off | Slow Flow Into WFC | Piston reaches S2, T1 time is evaluated and falls within parameters which define a slow leak Cycle 3 is counted. Alarm Logic is triggered. |
| Piston Reaches End of Travel | Cycle End | Closed | Off | None | Cycle 3 is registered and alarm logic commands the PV closed. LAS Interface advises the responsible party of the leak condition |

FIG. 13

LAS Interface Front Panel

POSITIVE DISPLACEMENT METERING SYSTEM

FIELD OF THE INVENTION

This application provides a Positive Displacement Metering System (PDMS) using a unique Water Fill Cylinder (WFC) in the preferred embodiment with two or more sensors that will replace the conventional water meter or paired with an existing water meter. In the alternate embodiment with three sensors it will safely indicate any minor or major leakage in the water system in homes and businesses and automatically shut water off if necessary along with notifying the responsible person for the property being monitored.

BACKGROUND OF THE INVENTION

The preferred embodiment of the PDMS can play a critical role in how water use is monitored by a utility, and in turn billed to the end user. Since the original water meters inception, there has always been, and continues to be, inaccuracy associated with very low water flow rates.

There are two general types of water meters on the market, mechanical and solid state. These meters are accurate and have served our nations communities well for many years, but these meters have limitations, they are only accurate inside a given range of flow. While these ranges are large, and cover almost all water use, very small flow still remain undetectable to both solid state and mechanical meters.

The accuracy of these existing meters is dependent on the type of water meter. Today's modern solid state water meters are extremely accurate, and can measure water flow inside its given range with close to 100% accuracy. The best solid state meter can accurately measure down to 0.03 GPM (0.03 GPM on a ¾ in pipe, this value jumps to 0.11 GPM for a 1 inch pipe). The accuracy of the PDMS preferred embodiment does not change with an increase in pipe diameter. They have proven to be reliable under a wide range of temperatures, pressures and hold up well under harsh environments. Further, these meters have no moving parts which greatly increase their reliability. The down side to this new technology is cost; many communities are hesitant to convert to this new technology for this reason.

Mechanical water meters, when measuring low flow, are the inverse of their solid state counterpart. These meters are inexpensive, however at lower flow ranges, they are inaccurate. While a solid state meter can report with a high degree of accuracy from 0.03 GPM (on a ¾ in pipe) and greater, the best mechanical water meter on the market today, will not achieve 100% accuracy until about 0.25 GPM.

Water is revenue, you can't bill for what you can't detect. Even though the low end range of detectable flow is quite good for a solid state meter, a large amount of water can still pass by the meter undetected. A flow rate of 0.03 GPM (at or below for a solid state meter is undetectable) is equal to 1.8 gallons per hour, that's a maximum of more than 43 gallons per day or 15,700 gallons per year, per customer, which the utility cannot bill for.

The revenue lost for water utility's using mechanical meters is significantly worse. The accuracy of a mechanical water meter at lower flow rates decreases with a decrease in water flow (starting at close to 100% accuracy for the best mechanical meter at 0.25 GPM, and an undetectable rate of 0.05 GPM or less). If the average flow rate were 0.14 GPM, only about 1 of this water flow would be accounted for by a mechanical water meter. That equates to more than 100 gallons of water per day that passes through the meter undetected. Annually that is more than 35,000 gallons of water per year, per customer that the utility cannot bill for.

When this data is further broken down, specifically when we take a closer look at the undetectable range, we come up with the following; 0.05 GPM is 2,160 Gallons over 30 Days, or 25,920 Gallons per year from one meter. In a community of 10,000, this could amount to 259,200,000 gallons per year (795 Acre Feet) of unbilled revenue.

The question we must ask is how many mechanical meters have leaks at or below 0.05 GPM? We do not know, as a mechanical meter cannot measure flow rates below 0.05 GPM. What we do know is that (according to the American Water Works Association) 16% of a meters usage occurs at low flow rates (less than 1 GPM) and a mechanical meter measures only a percentage of flow below ¼ GPM. This inability to record flow results in a significant loss of revenue for the utility.

For years, the insurance industry, home owners and businesses have incurred millions of dollars in losses due to unnecessary water damage. Typically the damage done is created by a small leak (such as a pinhole leak inside of a wall or slab) or a catastrophic failure in a pressurized pipe network (a burst pipe or washing machine hose failure). Presently, the most efficient way to guard against this type of leak is by continuously monitoring water flow into the structure. A tell tail sign of any water leak is continuous water flow, be it large (such as a burst water hose or pipe) or small (a pinhole leak in a copper pipe, in the slab or wall of the structure).

The purpose of the alternate embodiment of the PDMS is twofold. First, to warn of a leak condition (be it large or small) and turn off the flow of water to preventing damage to the property. And second, to indicate the amount of water being consumed by the property resulting in a more efficient use of water. Each of these tasks can be accomplished by actively monitoring the entire structure at all times.

The alternate embodiment of the PDMS is a system that monitors pressurized water flow into a home or building at all times, and when a leak is detected, will automatically shutoff water flow into the structure, and notify the party responsible.

At the present time, there are two major manufactures of continuously monitoring, whole structure leak detection systems. Both work well, but have large drawbacks, namely cost and the inability to detect very low rates of water flow, (neither unit can accurately measure, nor detect small flow rates, thus the existing units have no way of accurately measuring the amount of water leaked into the structure).

The PDMS alternate embodiment will provide the responsible party with four critical pieces of information:
  A precise measurement of the amount of water which has leaked into the structure.
  The amount of time which the leak has been active.
  The amount of water which is flowing into the structure at any time.
  The amount of water the occupant of the structure has used in accordance with their monthly water bill, and the percent remaining before a predetermined water target is met. This may be a maximum amount of water set by the water utility, or another water conserving target.

In this respect, before explaining at least one embodiment of the Positive Displacement Metering Systems in detail it is to be understood that the design is not limited in its application to the details of construction and to the arrangement, of the components set forth in the following description or illustrated in the drawings. The Positive Displacement Metering Systems consisting of the preferred embodiment using a unique Water Fill Cylinder (WFC) with two or more sensors and the alternate embodiment using three sensors is capable of other embodiments and of being practiced and carried out in various ways. In addition, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present design. It is important, therefore, that the claims be regarded as including such equivalent construction insofar as they do not depart from the spirit and scope of the present application.

SUMMARY OF THE INVENTION

The principle advantage of the Positive Displacement Metering System in the preferred embodiment with two or more sensors, is to give a precise rate of flow, a measurement of total water consumed, leak alert information and emergency action (if so programmed by the utility) and report it to the local water authority.

Another advantage of the Positive Displacement Metering System in the preferred embodiment, is that the device can be used with any type of water meter (be it solid state or mechanical), for any size pipe, and will monitor all flow rates in conjunction with the specified water meter attached to the PDMS preferred embodiment. The PDMS preferred embodiment tracks and records water flow inside the manufacturer specified flow rate envelope for the given water meter attached to the PDMS. When the lower limit of the water meters flow rate envelope has been reached (a rate of flow which the water meter manufacturer has specified as undetectable or inaccurate), the PDMS preferred embodiment will track all flow rates equal to or less than the manufacturers specifications of the water meter used with the PDMS, and add these lower rates of flow to the flow measured by the water meter attached to the PDMS preferred embodiment. The sum of these two meters (the water meter attached to the PDMS and the PDMS WFC cycle count) is a very accurate summation of the total amount of liquid to pass through the PDMS preferred embodiment. In very simple terms, the PDMS preferred embodiment expands the flow rate envelope of any water meter attached to it.

Another advantage of the Positive Displacement Metering System in the preferred embodiment is that the leak detection capability of the PDMS preferred embodiment can be removed, thus allowing the PDMS preferred embodiment to function solely as a water meter.

Another advantage of the Positive Displacement Metering System in the preferred embodiment and alternate embodiment is having a replaceable particulate screen located on the intake line before one or more of the Water Fill Cylinder Assemblies.

Another advantage of the Positive Displacement Metering System is that in the preferred embodiment and alternate embodiment the sensors are moveable. This allows the user to adjust X and Y values, which in turn controls when the PV will open, and the associated water meter becoming active. This feature assures the user that the associated water meter will only be functioning inside of the manufacturers associated flow envelope, thus ensuring the highest possible degree of accuracy for the PDMS and its associated water meter. By adjusting the Y value, the user can set the threshold of exactly how sensitive he would like the system to be, in other words, set the limitations of when the system will alarm for a very low flow value.

Another advantage of the Positive Displacement Metering System in the preferred embodiment or the alternate embodiment is that the unit is relatively inexpensive and simple to install.

Another advantage of the Positive Displacement Metering System is that in the preferred embodiment or alternate embodiment they can consist of multiple water fill cylinders in a redundant operation.

Another advantage of the Positive Displacement Metering System in the alternate embodiment is being able to know that you have complete control of the water entering into your home or place of business.

Another advantage of the Positive Displacement Metering System in the alternate embodiment is knowing if there is a leak, either small or large, you will be notified and the water can be shut off automatically.

Another advantage of the Positive Displacement Metering System in the alternate embodiment is knowing that if the tenant of the property is away, he or she will automatically receive notification of a leak condition, and action can be taken by the tenant via remote internet access to the PDMS, should it be necessary.

Another advantage of the Positive Displacement Metering System in the alternate embodiment is being able to monitor and control the system from the inside the building being monitored with the PDMS alternate embodiment interface.

Another advantage of the Positive Displacement Metering System in the alternate embodiment is that the PDMS alternate embodiment interface can be directly wired to the WFC Water Fill Cylinder or it can effectively function as a wireless system.

Another advantage of the Positive Displacement Metering System alternate embodiment is that with the PDMS interface, you can keep continuous track of your water usage, independent of the water utilities water metering system.

Another advantage of the Positive Displacement Metering System preferred or alternate embodiment, is that the Primary Valve (PV) can be operated manually should the automatic system malfunction, thus insuring that the property tenant is never in a "no water" situation.

Another advantage of the Positive Displacement Metering System is the system can operate as a leak detection system only, and function without the water meter. This would be accomplished by counting cycles inside of a given time range. When the cycle rate becomes high enough, which would represent a given flow rate, the system would alarm. Under Standard Flow, the unit would open the PV as it does in the PDSM preferred and alternate embodiments, and would close the PV in conjunction with time. If the PV closes during Standard Use water flow, the piston will move rapidly across from its home position to S2 and the PV would immediately open again. Water in this transitional phase would be provided by the flooded WFC.

The PDMS preferred embodiment is a very simple device, it is inexpensive and highly accurate at all rates of flow. When the PDMS preferred embodiment is paired with an existing water meter, be it solid state or mechanical, the rate of flow along with the total amount of water to flow through the PDMS is accounted for, recorded and reported. Now communities which cannot afford the cost of solid state meters can retrofit the PDMS preferred embodiment with their existing mechanical meters, and when combined, have a reporting system which is more accurate and more affordable than any standalone solid state meter.

The time required to recoup the cost of the PDMS preferred embodiment is greatly reduced in comparison to the replacement of an existing mechanical meter with a solid state meter. First, the overall cost of the PDMS preferred embodiment system is considerable lower than a solid state meter, (further when the PDMS is retrofitted to an existing water meter, the cost is even lower). Second, when the PDMS preferred embodiment is paired with a mechanical meter, the undetectable range is eliminated, allowing the utility to bill for the true total amount of water used.

The PDMS preferred embodiment and the PDMS alternate embodiment collect and operate in a similar manner, but how the information is distributed and acted upon is different. Example:

The information collected by the PDMS preferred embodiment, and the action the unit takes (rate of flow, total water consumed, leak alert information and emergency action) is reported to the water utility, not the property occupant, as there is no user interface associated with the PDMS preferred embodiment.

The water utility can program the PDMS preferred embodiment to shut-off water or be advised of an abnormal condition under a predetermined set of leak detection circumstances.

EXAMPLE

A rate of flow equal to ¼ GPH running for 12 hours (note that any flow rate and any length of time can be programmed) could trigger an "Abnormality Alert". The utility could then notify the customer and advise them of the possible leak condition, or the primary valve (PV) could be programmed to shut off at a given low flow rate. A high flow rate example would be a rate of flow equal to Standard Use (a shower, a flushing toilet etc.) running for 2 hours or more could trigger PDMS preferred embodiment to shut off. This condition would be immediately reported to the water authority, and the customer notified of the potential high rate of flow leak condition.

The information gathered by the PDMS preferred embodiment is conveyed to the applicable water authority via an AMR (Automatic Meter Reader). This is a widely accepted technology used by many water, gas and electric utilities. AMR technologies include handheld, mobile and network technologies based on telephone platforms (wired and wireless), radio frequency (RF), or power-line transmission.

The PDMS preferred embodiment does not have an interface, as the unit does not report to the occupant of the property being monitored. The PDMS alternate embodiment Interface has been replaced with a DAU or Data Acquisition Unit. The function of the DAU is to collect data (T1 and T2 time, piston position via sensors, position of PV, cycle count, flow rate and the total water passed through the Flow Meter etc.), calculate basic information derived from this data (total water consumed, leak rate of flow, total amount of water to leak into a property, etc.) and issue commands (manipulation of the PV, communication with the AMR). Additionally, the DAU can be programmed by the utility to preform functions in association with water usage, similar to the Home and Away functions of the PDMS (LAS) Interface.

The PDMS preferred embodiment can have additional sensors added to the Water Fill Cylinder (WFC) Assembly; these sensors are placed at a distance of roughly 1 inch apart and are referred to as WM 1, 2 and 3. T1 time is evaluated each time the piston passes WM 1, 2 and 3. This time is compiled, totalized and recorded by the DAU along with the cycle count. The calculation of T1 and T2 time remains the same, as well as the override function of sensor OR1.

The diameter of the cylinder in the PDMS preferred embodiment can be reduced to allow the piston to move a greater distance with the same amount of water displacement. With greater movement comes greater accuracy.

The PDMS preferred embodiment can send and receive commands and transmit data via the AMR. The commands may include, but are not limited to the remote operation of the PV (Primary Valve). This function would allow the water utility or other responsible party to remotely govern water flow in any situation the responsible party deems necessary.

The PDMS preferred embodiment is not limited by pipe diameter. The system will work accurately on large diameter pipe (supplying water to a large office building or community) and small diameter pipe (supplying water to a single family residence or apartment).

In a low flow situation, the PDMS preferred embodiment piston begins movement off of A1. At S1, T1 time begins; this is the same logic which runs the standard WFC of the alternate embodiment of the PDMS. When the piston reaches S2, T1 time is evaluated, and the appropriate logic is assigned to the water flow situation. The PV opens, the piston returns to A1, one cycle is counted and the process begins again. Should a low flow condition be detected, and it is interrupted by standard water use, then the override sensor would redirect the PDMS preferred embodiment to the correct logic. This is the same set of logic commands which run the alternate embodiment of the PDMS.

Should the piston be in motion due to low flow and then stop, the PDMS preferred embodiment logic will not record the given flow rate. Should the OR1 sensor be activated due to Standard Use water flow when the piston is stopped mid cycle, the PDMS preferred embodiment will count the cycle, but dismiss the flow data. The PDMS preferred embodiment takes the place of the traditional water meter and it is not installed inside of the building.

The PDMS preferred embodiment is capable of all that the PDMS alternate embodiment is capable of, but the data produced is reported directly to the governing water utility. For this reason, the PDMS Water Meter does not have interface, rather it has a Data Acquisition Unit (DAU).

The PDMS preferred embodiment gives the water utility options it never had before. Now a water utility can monitor flow rates that were previously undetectable, or measured with a high degree of inaccuracy and accurately bill for them. Additionally the utility can detect, shut-off and automatically report a potentially damaging leak. With the ability to retro-fit the PDMS unit onto existing water meters, the PDMS preferred embodiment makes all of this possible at a very economical cost to the municipality.

There are two primary components which comprise the alternate embodiment of the PDMS, namely, the Water Fill Cylinder (WFC) and the PDMS interface. The WFC holds approximately $\frac{1}{20}^{th}$ of a gallon of water. Attached to opposite sides of the cylinder are endcaps which house in flow and out flow ports. Inside the cylinder is a solid piston and a return spring, it is important to note that water does not flow through the cylinder. Outside of the cylinder is the primary water line, which attaches directly to the inlet and outlet ports of the cylinder. Between these two ports is a bypass water line. Mounted on this line are a solenoid shutoff valve and a water meter.

The PDMS preferred embodiment can be powered in several different ways. The unit can be hard wired to the property being monitored, and backed up by a 24 VDC battery which will provide power to the unit in-case of a power interruption. In warm climates, the unit can use a combination of a battery and a solar panel placed on top of the water meter housing. Typically this housing is a concrete box type structure. The box is buried, so as to leave the top of the enclosure exposed. This allows entry into the enclosure to service the unit, and is also where the solar panel is placed. The solar panel provides a trickle charge to the 24 VDC battery, which powers the unit.

The PDMS alternate embodiment is a very simple device; it is inexpensive and highly accurate at all rates of flow and all pipe diameters. When the PDMS alternate embodiment is paired with an existing water meter, be it solid state or mechanical, the rate of flow, in all respects, from zero to the water meters maximum rate is accounted for.

Both the PDMS preferred and alternate embodiment are capable of monitoring, recording, reporting and taking action against a leak condition. Further the PDMS preferred and alternate embodiment are not limited to water, but are capable of monitoring all liquids which move through a pressurized network of pipes.

The PDMS alternate embodiment interface can operate via a wireless network, or be hardwired directly to the WFC. The information relayed between the WFC and LAS Interface includes real time water flow information, present operating conditions, alarm information, manual functions such as turning the water off or disarming the LAS system. In addition to these features the PDMS interface can transmit leak information, wasteful water practices or take commands from a cell phone application. The PDMS alternate embodiment Interface also provides the user with information which can be used to conserve water.

The Home and Away Modes represent maximum time limits which standard water flow can be used in conjunction with the occupancy status of the property being monitored. When the tenant leaves the structure, the Away button (2-3 minutes) is pressed. When the occupant returns, the Home button (20-30 minutes) is pressed. Each of these functions tells the PDMS alternate embodiment of the predicted water demand inside of the designated time period. In the Away mode, we know that water demanded will be significantly lower; therefore the PDMS will associate large water demand over a short time span as a possible leak, rather than standard use. In the Home mode the opposite is true, the PDMS alternate embodiment is expecting the tenant to initiate water usage, and expecting that usage to last significantly longer.

The PDMS preferred embodiment does not have a Home and Away mode. Instead, the DAU can be programmed to alert the water utility of continues usage lasting for an amount of time greater than that specified by the utility. The utility will have several options on how to deal with an alert, from a phone call to the building being monitored, to precautionary measures being taken, which may include remotely shutting off the water.

The Home and Away modes are each associated with a programmable timer; typically the time associated with the Home mode is 20 to 30 minutes, and the Away mode, 2 to 3 minutes. Should these specific times be exceeded, the alarm will trigger, the PV (Primary Valve) will be closed, and the associated leak would stop. See "Interface" for further details on the functionality of the Home and Away buttons.

The differences between the two embodiments are minor. Each functions via logic which is virtually identical to its counterpart. The difference between the two units is primarily what is done with the information received:

The PDMS alternate embodiment will collect, report and act on a given set of instructions associated with, and displayed on, the PDMS alternate embodiment interface The PDMS preferred embodiment will report the collected data to the DAU (Data Acquisition Unit), and transmit that information to the water utility via the AMR (Automatic Meter Reader)

The X and Y time parameters represent programmed amounts of time which determine what action will be taken in association with the total amount of time the WFC piston took to travel from S1 (Sensor 1) to S2 (Sensor 2). The total time variable between S1 and S2 is referred to as T1 Time. The amount of water displaced between the home position, A1 (just prior to S1) and S2 is equal to $\frac{1}{20}^{th}$ of a gallon, or 1 cycle. These T1 time values will fall into one of three time categories: less than X seconds, greater than X but less than Y seconds and greater than Y. The amount of time assigned to X and Y can be adjusted by the customer or utility, but are preset to the following values, X=30 seconds and Y=24 minutes. The PDMS preferred and alternate embodiment uses T1 time in comparison to the value of X and Y, and in turn, assign the appropriate logic sequence, the lower the T1 time, the higher the flow rate.

Recorded Small Leak Flow—If the amount of time required for the piston to travel from S1 to S2 is greater than Y (24 minutes), then Recorded Small Leak Flow applies.

Small Leak Logic—if the amount of time required for the piston to travel from S1 to S2 is greater than X (30 seconds), but less than Y (24 minutes), then Small Leak Logic applies.

Standard Use Logic—If the amount of time required for the piston to travel from S1 to S2 is less than the value of X (30 seconds), then Standard Logic applies. Each stroke (or cycle) of the piston (the distance between the home position or A1 and S2) is equal to $\frac{1}{20}^{th}$ of a gallon or 6.4 oz.

The WFC associated with the PDMS preferred embodiment may be smaller in diameter and longer in length, and not necessarily equal to $\frac{1}{20}^{th}$ of a gallon. This amount will change with the diameter of the main water line.

The phases of operation associated with the PDMS preferred and alternate embodiment are programmed to evaluate the type of water flow entering the structure. By doing this, it can accurately assess how to respond to conditions associated with each type of flow. There are 5 phases of standard operation and 4 non-standard phases of operation. Each standard phase is directly associated to the assigned logic mode of the PDMS preferred and alternate embodiment.

Standard Phases of Operation:
Evaluation Mode
Recorded Small Leak Flow (Greater than Y Time 24 min)
Small Leak Flow (Greater than X Time 30 seconds, Less than Y time 24 minutes)
Standard Use Flow (Less than X Time 30 seconds)
Leak Alarm
Non-Standard Operation:
Override Function (O.R. Sensor)
Reset Function (Unique to PDMS alternate embodiment)
Water Off (Unique to PDMS alternate embodiment)

PDMS Off/Water On (Unique to PDMS alternate embodiment)

Evaluation Mode T1 (Time Determination)

In the Evaluation Mode, the primary valve (PV) is closed (reference FIG. 1). The PDMS preferred and alternate embodiment is monitoring the property for water demand of any kind, once demand occurs, the PDMS will evaluate the type of water use occurring (be it a leak or standard use), assign a value to that use (this value is T1 time) and open the primary valve to feed the water demand and return the WFC piston to A1.

The PDMS preferred and alternate embodiment always begin their water monitoring sequences from the Evaluation Mode. Once water use has stopped inside the structure, or fallen below a flow rate designated by X (thus closing the PV or Primary Valve) the PDMS will return to this mode and continue the monitoring process.

The Assessment of T1 Time

T1 time is determined by measuring the time variable of the WFC piston between S1 and S2. This is a function of the Evaluation Mode. Example: Should any kind of water use take place inside the structure being monitored, be it a small leak, large leak, or standard water use, water will flow in order to feed the source of that demand, this water must come from the WFC, as the PV is closed. The WFC Piston inside the cylinder will move away from its home position (A1). The speed at which the piston moves away from A1 is directly related to the flowrate of the water being demanded. As the piston moves forward, the position of the piston is monitored by 3 sensors (3 sensors in the alternate embodiment, 3 or more sensors in the primary embodiment), S1, S2 and OR1 (if necessary). When the piston reaches S1, a timer begins (this is the start of T1 time). As the piston continues forward, the second sensor (S2) will be triggered (this is the end of T1 time). When S2 is triggered, the appropriate logic will be assigned to the occurrence through the following steps.

1) T1 time stops and is reset to zero at S2
2) T1 time is evaluated
3) If T1 time is greater than Y (24 minutes), the PV opens for 5 seconds allowing the cylinder to equalize pressure and the spring loaded piston to return to A1 (home position). 1 "Recorded Small Leak" cycle is counted, the system is reset when the piston reaches A1 and the PV closes. The cycle then begins again.
4) If T1 is less than Y (24 minutes), but greater than X (30 seconds), the PV opens for 5 seconds allowing the cylinder to equalize pressure and the spring loaded piston to return to A1, the PV closes. This is counted as 1 "Small Leak" cycle.

The cycle begins again.

5) If T1 time is less than X, the primary valve (PV) is opened, allowing for standard water use to occur (a flushing toilet for example), and the piston returns to A1. Standard Use logic will be assigned to this occurrence. T2 time starts and the position of the PV becomes a function of the water flow meter (PV will close at a minimal flow rate known as X-flow)

Recorded Small Leak (Greater than Y Time 24 Minutes)

Recorded Small Leak logic represents a flow of roughly 1 drip every 2 seconds or slower. It is a value which is adjustable by the customer. When drip rates are very low, the responsible party may choose a point at which to alarm. By increasing the value of Y, the alarm will activate for a slower drip rate, a decrease in Y value will cause the alarm to activate at a faster rate. The baseline Y rate is 24 minutes, this equates to roughly 1 drip per 2 seconds.

In Recorded Small Leak logic, when the piston reaches S2, the PV will open, allowing the WFC to equalize in pressure and the piston to return to the home position (A1). At the end of 5 seconds, the PV will close; redirecting the low flow water demand back to the WFC and the Recorded Small Leak cycle will be counted (when this count reaches 5, the Alarm logic will activate for the PDSM alternate embodiment).

Small Leak Flow (Between X and Y Time or 30 Seconds and 24 Minutes)

The cylinder moves forward off of its home position (A1), at S1, T1 time begins, at S2, T1 time stops. If T1 time is greater than X time, but less than Y time, the PV will open for 5 seconds, returning the piston to its home position, and a cycle will be counted and assigned to Small Leak Flow (when this count reaches 3, the Alarm logic will activate for the PDSM alternate embodiment).

In relation to the PDMS alternate embodiment, once Small Leak Flow logic has been assigned, each time S1 and S2 are triggered, the amount of water displaced is recorded (this amount of water is equal to the cycle count multiplied by $\frac{1}{20}^{th}$ of a gallon) and the flow rate is calculated (as it took T1 time to move from S1 to S2). Once the piston reaches S2 on the $3^{rd}$ (or more) cycle, the total amount of time the three cycles took, plus the total amount of water leaked into the structure will be displayed on the PDMS alternate embodiment interface. After 3 (or more, depending on the set up) cycles, the invention would consider this to be a leak condition and the Leak Alarm logic sequence would begin. Relative to the PDMS preferred embodiment, the sequence of events is identical to the PDMS alternate embodiment, only the information is now recorded by the DAU and relayed to the water utility via the AMR. Depending on how the utility has set up the meter, the utility will determine the course of action to be taken to inform the tenant of the leak condition.

Standard Use Leak and Max Continues Flow Times

For the PDMS alternate embodiment, the action taken when a Standard Use leak condition (A T1 time of less than X time, 30 seconds) is detected, is directly associated with the Home or Away time of 2-3 min Away, or 25 to 30 minutes Home. At the expiration of these times, Leak Alarm logic will be entered.

The PDMS preferred embodiment uses a single time length (not Home or Away); this amount of time is determined by the utility. At the expiration of this time, Leak Alarm logic will be entered, recorded by the DAU and reported to the utility via the AMR. The water flow can be automatically shut off by the DAU (if so programmed), or the utility can monitor the situation and determine the course of action to take, be it a phone call to the property, or remotely turning off water. It is important to note, that Standard Use leak detection does not count cycles.

Water Meter Closing the Primary Valve

Once Standard Use Flow logic has been assigned, and the PV opens, the point at which the PV closes, becomes a function of the water flow measured by the water meter. Once water flow drops to the water meters lower range of detectability (plus 10%, referred to as X-Flow), the water meter will signal the PV to close, and the Evaluation Mode will be entered. The water meter communicates flow information to the PDMS alternate embodiment interface through a digital or analog connection (or directly to the DAU through a digital or analog connection for the PDMS preferred embodiment). The Water Meter will command the PV to stay open as long as the water flow is greater than X-Flow. Should water demand stop, or fall below the value of X-Flow the flow meter logic would close the PV, the system would return to the Evaluation Mode and T2 time would be reset to zero.

Measuring T2 Time

T2 measures the amount of time that the PV is open. As soon as the PV opens, T2 time starts, and as soon as the PV closes, T2 time resets to zero. T2 time is used to measure time values associated with the Home and Away mode for the PDMS alternate embodiment and Max Continuous Flow time for the PDMS preferred embodiment. When the Home, Away or Max Continuous time values are reached, the system will alarm.

Exceeding Standard Use Home or Away Time (PDMS Alternate Embodiment) When the PDMS alternate embodiment is monitoring Standard Use flow through the water meter, and Home or Away time has been exceeded, (the expiration of Home or Away time, which is equal to a T2 time of 2-3 min Away or 20-30 min Home) and during this period of time, the flow rate does not reduce to a value less than X-Flow, then the PV will close and Alarm Logic will be begin.

Exceeding Standard Use Max Continuous Flow Time (PDMS Preferred Embodiment)

When the PDMS preferred embodiment detects Standard Use flow, and the max continues run time set by the water utility has been exceeded, (the expiration of T2 time), and during this period of time, the flow rate does not reduce to a value less than X-Flow, then the PV will close upon the expiration of T2 time (relative to the time established by the utility) or, the utility will be notified of the high flow leak condition and the valve will remain open, action taken is decided upon by the utility. T2 time is used by the PDMS preferred embodiment to measure the total amount of time that has transpired between the opening of the PV and the expiration of time preset by the water utility. T2 time begins when Standard Use logic is assigned and the PV opens.

X-Flow and X are defined as follows:

X is the maximum T1 time value at which flow measurement will be controlled by the water meter. Any T1 time value equal to or less than X (typically 30 seconds), will open the PV and allow the water meter to track flow. Any T1 value greater than X will begin counting cycles to track water use at low rates of flow, or for leak detection.

X-Flow is the minimum flow rate in GPM that the flow meter is accurately capable of tracking, plus 10%. The value of X (in GPM) must always be greater than the value of X-Flow, otherwise the PV could open to a rate of flow that the water meter was not capable of tracking. When flow is reduced to a value equal to X-Flow, the PDMS preferred and alternate embodiment will open the PV, and the WFC will count cycles to track low water flow rates.

Leak Alarm Criteria (Applicable to the PDMS Alternate Embodiment)

Leak Alarm logic will activate when the following criteria are met in any category (Small Leak Flow, Recorded Small Leak Flow and Standard Use).

Small Leak Flow logic has counted three (or the designated number) of cycles.

Recorded Small Leak Flow—Recorded Small Leak Flow logic has counted 5 (or the designated number) of cycles.

Standard Use Flow—Standard Use Flow logic has detected both of the following conditions.
1. Home or Away time has expired
2. No interruption to Standard Flow has occurred during the Home or Away time period (turning off the water or the rate of flow falling below the value of X-Flow)

If these conditions are met, the following Leak Alarm actions will take place:

The PV will be commanded closed

The PDMS alternate embodiment interface will sound an audible alarm

The PDMS alternate embodiment interface will illuminate a red LED indicating an alarm condition The PDMS alternate embodiment will display the amount of water which has flowed into the structure, and the amount of time that has passed from the time the leak started to the time the PV was closed.

If the leak was the result of Small Leak Flow, the time would be equal to T1×3 and the volume of water would be equal to 3 cycles.

If the leak was the result of Recorded Small Leak Flow, the time would be equal to T1×5 and the volume of water would be equal to 5 cycles.

If the leak was the result of Standard Use Flow, the time would be equal to T2 (which will always be the programmed Home or Away time) and the total amount of water which flowed through the flow meter in T2 time.

In the PDMS alternate embodiment, once the alarm sounds and the PV closes, the piston will move away from A1, forward until the full length of the cylinder is reached, and stop. Alarm logic will advise the PDMS alternate embodiment not to open the PV upon reaching S2.

Once the PDMS alternate embodiment has entered the Leak Alarm logic sequence and activated the alarm, the system can only be reset by physically interacting with the PDMS alternate embodiment interface. The following are the options the tenant would be presented with on the PDMS interface. They will be discussed in detail under "Non-Standard Operation".

Reset/Silence Function

Water Off

PDMS Off/Water On

Leak Alarm Criteria (Applicable to the PDMS Preferred Embodiment)

Leak Alarm Logic will activate when the following criteria are met in any leak category (Small Leak Flow, Recorded Small Leak Flow and Standard Use). It is important to note that the number of cycles which trigger the Alarm Logic, AND the action that the system will automatically take, are defined by the water utility. The action taken may consist of only reporting the leak scenario, and not closing the primary valve.

Small Leak Flow logic has counted the designated number of cycles.

Recorded Small Leak Flow—Recorded Small Leak Flow logic has counted the designated number of cycles.

Standard Use Flow—Standard Use Flow logic has detected both of the following conditions.

Max Continuous Flow time has expired.

No interruption to Standard Flow has occurred during the Max Continuous Flow time period (turning off the water or the rate of flow falling below the value of X-Flow)

If these conditions are met, the following Leak Alarm actions will take place:

The PV will be commanded closed (if this option has been chosen by the utility)

The Leak Alarm condition will be recorded by the DAU and reported to the utility through the AMR. The information reported will include the length of time the leak condition has existed, the total amount of water which has flowed into the property being monitored, the flow rate of the leak, and the current position of the PV.

If the leak was the result of Small Leak Flow, the time reported to the utility would be equal to T1 multiplied by the designated number of cycles, and the volume of water reported would be equal to the designated number of cycles, multiplied by the volume of water in one cycle.

If the leak was the result of Recorded Small Leak Flow, the time would be equal to T1 multiplied by the designated number of cycles, and the volume of water reported would be equal to the designated number of cycles, multiplied by the volume of water in one cycle.

If the leak was the result of Standard Use Flow, the time would be equal to T2 (which will be a programmed time set by the utility) and the amount of water reported to the utility would be equal to the total amount of water which flowed through the flow meter in T2 time.

Note: The volume of water displaced by one cycle will change in accordance to the needs of the utility, capability of the assigned water meter type, and expected water flow, the larger the pipe diameter, the larger the cycle volume.

In the PDMS preferred embodiment, once the alarm condition is recorded and the PV closes (if so elected by the utility), the piston will move away from A1, forward until the full length of the cylinder is reached, and stop, thus stopping all water flow into the building being monitored. Once the PDMS preferred embodiment has entered the Leak Alarm logic sequence, and if the utility has chosen to take automatic action by closing the PV, the valve can subsequently be remotely re-opened through a command from the governing utility, via the AMR.

Override Sensor (OR1 Sensor)

If the PDMS preferred or alternate embodiment has detected a leak, and the piston is between S1 and S2, the wrong logic sequence can be assigned should a valve be opened inside the structure being monitored while the leak event is occurring. The OR1 sensor prevents this possibility, by measuring the time it takes the piston to travel from OR1 to S2. Should this time be under 2 seconds, the PDMS will proceed directly to Standard Use Logic, even if T1 time demands a different logic assignment.

The Override sensor is located of an inch prior to S2. Should a valve be turned on inside the structure, during which time the piston is monitoring a low flow condition, the piston will suddenly move forward at a faster rate, cross the OR1 Sensor (Starting Override Time) and continue to S2. At S2 both OR1 Time and T1 time stop. If OR1 Time is less than 2 seconds, it will supersede T1 time and Standard Logic will be used for the water use event.

Non-Standard Modes of Operation

In conjunction with the PDMS alternate embodiment, the individual or institution responsible for monitoring the property may find it necessary to interact with the invention in a fashion other than pressing the Home or Away buttons. The following two buttons and guarded switch serve a specific purpose and are not a part of the inventions standard use:

Reset/Silence button: Once the alarm sounds or if an error in the logic occurs. Pressing and holding the Reset/Silence Button will silence the audible alarm and extinguish the red LED alarm light. Additionally it will open the PV for 5 seconds, allowing the piston to return to A1, where the system logic will be reset, and the Evaluation Mode will start over again. The Reset function can be used to confirm a leak, or simply reset the system should an error occur.

Note: The Reset/Silence button will silence the alarm and reset the system but, should the system activate again, the audible and visual alarm will function normally.

Water Off button—If water flow to the property is no longer necessary, and the responsible party wishes to turn the water off. Pressing the Water Off button will close the PV and discontinue monitoring of the S1 and S2 sensors. See "Interface" for further details on the functionality of the Water Off button.

In the PDMS alternate embodiment, the Off/Water On (guarded switch) is used if the responsible party should choose to run water into the property and by-pass the PDMS alternate embodiment all together, lifting the guard and moving the switch to the "on" position will latch the Primary Valve open, allowing water to flow unmonitored into the property. Using a guarded switch prevents the responsible party from accidently entering this mode and leaving the property under the false pretense that the system is functioning normally.

Interface—Liquid Crystal Display (LCD) (PDMS Alternate Embodiment Only):

Leak Volume

The total amount of water which has leaked into the building being monitored (Only displayed in an alarm condition, when water has been automatically shut off by the PDMS alternate embodiment)

Total Time

The total amount of time which has transpired for the leak event displayed (Only displayed in an alarm condition, when water has been automatically shut off by the PDMS alternate embodiment)

Flow GPH

LCD output which displays water flow in real time. Graduated in GPH (Displayed at all times under normal conditions)

Buttons on the PDMS Alternate Embodiment Interface:

Home—When this button is pressed, the button will illuminate green (or a green LED will illuminate) to identify Home logic as active. Pressing this button will automatically extinguish (and deactivate) the Away mode. The Home mode is typically (depending on the responsible parties' preference) set for 25 to 30 minutes.

Away—When this button is pressed, the button will illuminate yellow (or a yellow LED will illuminate), to identify the Away logic as active. Pressing this button will automatically extinguish (and deactivate) the Home mode. The Away mode typically is set for 2 to 3 minutes.

Water Off—When the button is pressed, a red LED marked Water Off will illuminate. Further the mode that was previously selected (Home or Away) will automatically be deselected and deactivated.

Reset/Silence—Pressing this button and holding it in for 5 seconds will silence the PDMS alternate embodiment alarm and reset the PDMS to the Home mode.

LED Lights on the PDMS Alternate Embodiment Interface:
  Water Off LED—Associated with the Water Off button. It indicates that the PV is closed, and that water flow is no longer available to the building. Steady red LED
  Off/Water On LED—Indicates that the PDMS Off/Water On guarded switch has been selected on. In this position, the PV is latched open, and the building is no longer being monitored for leaks. Steady red LED
  Water Leak Alarm—Indicates that a leak condition has been detected. Flashing red LED.
Guarded Switch on the PDMS Alternate Embodiment Interface:
  Off/Water On—This guarded switch turns the water leak detecting capability of the PDMS alternate embodiment off, but allows water to flow freely into the building. It is a guarded switch to prevent its inadvertent activation. When selected, the associated LED will illuminate, the preselected Home or Away mode will deactivate and the LED lights will extinguish.
Assembly of the PDMS preferred and alternate embodiment (instructions describe the dimensions related to a ¾ in pipe)
  Piston—The piston is approximately 2.5 inches in diameter and 2 inches long, it contains a 1.5 inch deep by 1.25 diameter centered cut-away for the spring to collapse into when the piston is at its max length of travel. In the piston are 3 grooves which are approximately ½ inch deep and ¼ inch wide and nm along the circumference of the piston. The center groove contains a circular magnet made of a pliable substance which allows it to be stretched and fit into the groove around the piston. The two outer grooves house a seal. The seal is stretched and collapsed into each groove. The assembly of the piston is complete.
  Water Fill Cylinder (WFC) assembly—The cylinder is stainless steel and is approximately 6 inches long, the ID is 2.5 inches. On the end of each cylinder are endcaps, each with a inch pipe threaded hole in the center. In each corner of the endcap are 0.27 inch through holes which tie rods fit into. On one side is a circular groove approximately 0.05 in deep, matching the cylinder diameter. A rubber gasket is placed into this recession. Inside of the cylinder retention groove is another spring recession hole, 0.5 in deep×1.25 inches in diameter, it is also on center. A replaceable particulate screen is located on the intake line before the Water Fill Cylinder Assembly.
  Standing the cylinder vertically, place one end of the cylinder into the endcap recession. The piston is placed into the cylinder so that the 1.25 inch cut away is facing upward. Place the spring into the cylinder, and inside the spring cutaway of the piston. Place the endcap on the opposite end of the piston, allowing the spring to fit into the spring retention cutaway inside the endcap.
  Pass four ¼ inch diameter tie rods through each of the 0.27 in holes in each corner of the endcaps. Tighten with nuts on the opposite ends. Affix sensors to the tie rods approximately 1 inch from either end of the cylinder (sensor position will be fine-tuned during the testing phase). Affix the Override sensor approximately ⅝ of an inch from S2. The assembly of the Water Fill Cylinder is complete.
  Full Assembly—Place the WFC horizontally on a work bench, at both ends of the WFC, screw a ¾ inch stainless steel T into the endcap, and align the L so that it is facing straight up. Screw a ¾ in stainless steel T onto the inflow L. Align the T so that each exit point is aligned parallel with the lengthwise alignment of the WFC. Put the WFC aside. A stainless steel pipe nipple is screwed into both ends of the Primary Valve. Next a pipe coupling is screwed into the outflow end of the PV. The Water Meter is then screwed onto the coupling. On the opposite end of the water meter, another stainless steel coupling is screwed into place. Into this coupling, a ¾ in stainless steel T is screwed into place with a pipe nipple between the T and the water meter coupling. The total length of the Water Meter/PV assembly should match its WFC assembly counterpart. At the bottom of the water meter assembly T is a ¾ in compression pipe fitting.
  Join the WFC assembly and the Water Meter/PV assembly by screwing the inflow side of the Water Meter/PV assembly into the T of the WFC. Next align the bottom of the T on the Water Meter/PV assembly with the L on the WFC assembly and screw the compression fit nut into place. The PDMS assembly is complete.
Testing PDMS Preferred and Alternate Embodiment:
  The PDMS preferred or alternate embodiment is coupled into a testing rack, the PV side of the PDMS is connected to a pressurized water source. The opposite end is connected to a valve.
  With the valve open, the PDMS is flooded to rid the system of air. The pressure is brought up to 120 PSI and the unit is checked for leaks.
  Next the PDMS alternate embodiment interface (or DAU in the case of the preferred embodiment) is wired to the Water Meter, the PV, and the sensors. With power on the unit, the PV functionality is checked, along with the Water Meter. Once these two items check "good," the S1 and S2 sensor positions are found.
  When the PV was opened for the first time, it moved the piston to the A1 home position. The S1 sensor is now moved by hand along the face of the cylinder until the magnet inside of the cylinder (attached to the piston) is detected by the S1 sensor. At this point, the sensor is moved towards the center of the cylinder, until it is approximately 0.150 in. away from the point at which the magnet was initially detected by the S1 sensor. This is the S1 sensor position. The S2 sensor is then positioned a specific distance from S1.
Recorded Small Leak Flow Test:
  This test confirms the system's ability to reset itself to the Evaluation mode should the piston move forward across S1 and S2 in a time greater the value of Y. The valve is set to a drip cycle that is less than a flow rate of approximately 1 drip per 2 seconds. A timer is started and the cylinder moves across S1 and S2. The PDMS measures a time of 24 plus minutes (or a time designated by the user). The PV opens, and the PDMS preferred or alternate embodiment returns to the Evaluation mode and 1 cycle is counted.
Small Leak Flow Test:
  The PDMS alternate embodiment interface is preprogrammed to alarm after 3 cycles. For testing purposes, the DAU preferred embodiment is also programmed this way. The valve is turned on to a drip rate which produces a Y time of less than 24 minutes, but more than an X time of 30 seconds. The piston begins movement from A1, once the piston reaches S2, the PDMS system is checked to confirm the following:
    1) The end of T1 time
    2) The start of T2 time
    3) The PV opens/closes properly
    4) The piston returns to A1

5) One cycle is counted in the register
6) The system continues to run until the cycle count is 3 and Alarm logic begins.

Standard Use Flow Leak Test:
1) The PDMS alternate embodiment Away mode is selected on the interface, (for the preferred embodiment, the maximum continuous run time is set to 3 minutes). The valve on the test stand is opened to allow water to pass at rate which represents standard use. At the end of 3 minutes, the PDMS preferred or alternate embodiment recognizes this situation as a Standard Use leak and closes the PV and enters Alarm logic.
2) The Away mode is selected on the interface, (for the preferred embodiment, the maximum continuous run time is set to 3 minutes). The test stand valve is opened and water is allowed to flow at a rate which represents standard use. After one minute, the flow is stopped and the end of T2 time is confirmed through the Water Flow meter commanding the PV closed. The system returns to the Evaluation mode.
3) The Away mode is selected on the interface, (for the preferred embodiment, the maximum continuous run time is set to 3 minutes). The test stand valve is opened and water is allowed to flow at a rate which represents standard use. After one minute, the flow rate is reduced to a value greater than Y. T2 time stops, the PV closes, the piston moves away from A1 and the Evaluation mode is entered.

Override Sensor Test:
Reference the PDMS preferred or alternate embodiment. Open the valve on the test stand to a value which will allow the piston to reach S2 in a time greater than X (3 minutes for example). When X time (30 seconds) is reached, fully open the valve. The Override sensor should detect the time value between the OR1 Sensor and S2 as being less than 2 seconds, command the PV open, and assign Standard Use Flow logic to the scenario.

Alarm Test:
At the end of three test events (The Small Leak Flow test, Recorded Leak Flow test and the Standard Use Flow leak test), the PDMS preferred and alternate embodiment should enter Alarm logic. Alarm logic is confirmed at the end of each test. At which time the PDMS alternate embodiment Interface Reset/Silence button is checked, or the PDMS preferred embodiment Interface DAU recording/reporting features are checked.

PDMS Alternate Embodiment Interface Test:
At the completion of the PDMS preferred and alternate embodiment WFC Alarm test, the functionality of the interface will be checked.
1) Home mode should cancel the Away mode and vice versa
2) Home and Away timing are programmed to 2 and 30 minutes
3) Selection of Water Off or PDMS Off/Water On cancels Home and Away mode
4) In the Alarm phase of the Small Leak Flow test, Recorded Leak Flow test and the Standard Use Flow leak test, the time and water volume readings appear correctly on each LCD window.
5) Accurate water flow appears in the LCD window
6) Water Off closes the PV, discontinues sensor logic and illuminates the Water Off yellow LED
7) Turning on the PDMS Off/Water On switch illuminates the red LED, latches open the PV and discontinues sensor logic.
8) Pressing and holding the Silence/Reset button resets the PDMS to the Home mode, Silences the alarm and extinguishes the red Alarm LED.

Calibrating the PDMS Preferred and Alternate Embodiment:
The PDMS preferred and alternate embodiment must be calibrated to the specific water meter attached to the invention. The PDMS will produce an accurate result with any type of water meter attached to it, however it must be calibrated in order to achieve this high degree of accuracy. Calibration is completed on the test rack with the leak valve closed. it can also be completed in the field.

Step one: Determine the exact amount of water (volume) displaced in one cycle. For a ¾ in main water line, the invention uses a cylinder which will displace $1/20^{th}$ of a gallon, or 6.4 OZ. when the piston moves from A1 to S2.

Step two: When the piston reaches S2, the PV will open and the piston will reset to the home position. In this phase, note the amount of water detected by the water meter. This amount of water will be equal to or less than 6.4 OZ. (Note: A solid state water meter will detect a larger amount of water than a mechanical meter).

Step three: Subtract the amount of water detected by the water meter from the amount of water contained in the WFC. The difference between the two totals is equal to the amount of water in one full cycle. It is this amount of water which is used to determine total flow over a given time period under various rates of flow.

Example: The total volume displaced by one cycle is 6.4 OZ. When the piston retracts to its home position (A1), the total amount of water detected by the water meter was 3.3 OZ. Therefore, one cycle is equal to a total of 3.1 OZ of water.

Total water flow is equal to the water meter reading plus the total number of cycles (with one cycle being equal to the amount of water previously calculated). This total amount will be reported to the tenant via the PDMS alternate embodiment interface or via the AMR attached to the PDMS preferred embodiment.

Alternate Water Flow Route
A variation of the PDMS WFC is applicable to both embodiments. In the PDMS preferred and alternate embodiments, when the piston reaches S2, the PV opens and pressure on the forward and aft side of the piston is equalized, allowing the spring to push the piston back to its A1 position. Alternatively, a separate pipe connecting the inflow endcap to the outflow endcap, with a solenoid valve placed on this pipe could be used to equalize pressure, and allow the piston to return to the A1 position. The addition of this pipe would eliminate several of the calibration steps previously mentioned, and would allow water to flood the opposite side of the WFC without passing through the water meter.

Attaching the PDMS WFC alternate embodiment to the main water line:
1) The Water Fill Cylinder is installed between the water meter and the building to be monitored. When making the decision to install the PDMS alternate embodiment, it must be determined if irrigation systems will be monitored as well. If the decision is made to only monitor the use of water flowing into the building, and not irrigation systems, then the PDMS alternate embodiment WFC should be placed downstream of the irrigation pipe network.
2) The PDMS alternate embodiment system can be placed vertically, horizontally, or at an angle, the functionality of the system is unaffected by the angle of the WFC (unless the unit is to be installed in an area exposed to freezing temperatures, see "Sub Freezing Temp installation")

3) Begin by identifying an area with approximately 16 to 18 inches of straight water pipe, before or after irrigation pipes, depending on what will be monitored. Cut and remove the pipe from the main water line. The PDMS alternate embodiment can be attached to any pipe material (PVC, Stainless, Copper etc.)

4) Position the WFC to match the direction of water flow as depicted by the arrow on the WFC and PV. Attach the WFC with dielectric pipe couplings.

5) Mount the PDMS alternate embodiment interface in a position which is easily accessible to the occupant of the property (or if the property is being monitored by a person other than a property occupant, place the interface in a location where it might be placed in an environmental lock box). An example of this may be adjacent to a garage door or burglar alarm interface. Mounting the unit inside a home is acceptable, but the wiring will need to run through the walls.

Sub-Freezing Temperature Installation of the PDMS Preferred or Alternate Embodiment:

Special consideration must be taken into account when installing the PDMS preferred or alternate embodiment in an area of the country routinely exposed to freezing temperatures.

Should the PDMS preferred or alternate embodiment be installed in an area exposed to freezing temperatures, it is recommended that the unit be well insulated and if necessary, heated electrically.

The following precautionary measures should be adhered to when installing the PDMS preferred or alternate embodiment:

1. Should the property be located in an area where sub-freezing temperatures occur, it is recommended the unit be placed inside of the property, such as a basement.
2. It is recommended that the PDMS alternate embodiment be installed upstream of a water drain valve. Should the property be left for long periods of time, draining water from the water pipe network and the WFC is recommended.
3. When installed in areas where freezing temperatures are common, the angle at which the PDMS preferred and alternate embodiment is mounted, and the position of the WFC in association with the water supply line are very important. Reference the following:

If the unit is installed horizontally, the WFC must be installed above the main water line. This will allow water to flow out of the WFC when the pipes are drained.

If the unit is installed in a freezing environment and the orientation is vertical. The WFC can only be installed so that water is flowing DOWN into the unit, not up. Should the unit be installed vertically, with the water entering the bottom of the unit and flowing up (improper installation), rather than the top (proper installation), when water is drained from the pipes, the cylinder will retain water inside of it, this water cannot be drained Wiring the PDMS Alternate Embodiment to the Interface.

A 30 foot wiring harness is provided with the unit. Attached to either end of the wire are a series of wire connecting plugs. One end has 3 plugs, the opposite has 1 plug. Once the path for the wire is determined, run the wire along its path plugging the WFC (3 plugs) into the Water Meter, Sensors and PV. The opposite end of the wiring harness should be plugged into the LAS interface.

The PDMS alternate embodiment interface can be directly wired to the WFC, but can also function as a wireless system.

Powering the PDMS Preferred and Alternate Embodiment.

There are several different power supply options. These include hard wiring the PDMS preferred and alternate embodiment, solar power, and battery power.

The PDMS preferred embodiment can be hardwired directly to the buildings power supply. This method will provide power to the unit's back-up 24 VDC battery, as well as the DAU.

The PDMS preferred embodiment can operate on battery power, battery power in conjunction with solar power or battery power in conjunction with 120 VDC power. The solar panel provides a "trickle charge" to the unit's primary 24 VDC battery. Placement of the solar panel can be directly on top of the units concrete meter box (Note: solar power is not an option in all areas of the country).

The PDMS alternate embodiment interface requires 120V power, and can either be hard wired into the properties power supply, or plugged into a standard 120V outlet.

The PDMS primary and alternate embodiment both contain a 24 VDC back-up battery. If power to the unit should fail, the PDMS alternate embodiment will immediately switch to this source of power and continue to operate normally.

Testing the PDMS Preferred and Alternate Embodiment after Installation:

Note: After the PDMS preferred embodiment is installed, the technician will run similar tests as described below, however because the PDMS preferred embodiment does not have an interface, these tests are completed using a handheld display which plugs directly into the DAU.

Once the PDMS alternate embodiment is installed, it will be tested. Start by turning water to the property on with the PV closed. The position of the PV can be controlled by selecting Water Off on the interface, check for leaks. Next, lift the guard and move the PDMS Off/Water On switch to the "ON" position. This will allow water to flow into the house and flood the upstream side of the WFC (make sure a valve is open inside the property, this will allow air in the water pipe network to escape). Once the pipes are flooded, check the system for leaks. Next, turn the PDMS Off/Water On switch off. The green Home light should illuminate, the PV will close, and the property is now being monitored.

Note: If the WFC is installed for cold weather operation, when the PDMS alternate embodiment Off/Water On switch is turned off, air may still be trapped inside of the downstream end of the WFC. To remove the air, the piston must be actuated a second time. Do this by pressing the Water Off button and opening a facet inside the monitored property. This will move the piston forward, forcing the air into the primary water line. Next, press and hold the Silence/Reset button for 5 seconds, this will open the PV and eject the air out of the facet and return the system to the Evaluation mode.

Abnormal Operation:

PDMS Preferred and Alternate Embodiment Battery Back-up Should power to the property being monitored fail, The PDMS preferred and alternate embodiment are equipped with a 24V DC back-up power supply. If a power interruption occurs, the PDMS unit will continue to function normally.

The back-up battery is internally stored inside of the PDMS alternate embodiment Interface and inside the DAU of the PDMS preferred embodiment. The battery is under continuous charge whenever power is being supplied to the interface or DAU.

Manual Operation of the Primary Valve:

Should the PDMS preferred or alternate embodiment fail, or 120 VDC power AND the back-up battery fail there is a high degree of likelihood that the PV will be closed. If this is the case, water will stop flowing to the property and the valve must be operated manually. To operate the valve manually, go to the PDMS WFC and locate the PV. On the top of the valve is a small cylinder, it is directly attached to the valve. Pulling up on this cylinder will latch the valve to the open position, and will start the flow of water to the property. At this point, the property will not be safe from water leak damage, and rates of flow below the water meters range will not be directed to or recorded by the WFC. Standard flow rates and volume within the water meters range will continue to be recorded.

Water Conservation:

Both the PDMS preferred and alternate embodiment can contribute toward using water more efficiently. Because each unit reports to different end users, the role each unit plays in water conservation are unique to its counterpart.

Water Conservation and the PDMS Alternate Embodiment

The PDMS alternate embodiment can display the total amount of water used in coordination with a property owner's monthly water average, or allotment. The middle LCD will display the total amount of water that has passed into the property since day one of the billing cycle and the bottom LCD will display the percentage of water remaining before a water usage target is reached (this may be an amount of water in relation to maximum usage limits prescribed by the utility). This feature allows the customer to gain the upper hand on water usage, as knowledge of excessive water usage will avoid cost overages and deter wasteful use of a resource that is becoming increasingly more valuable.

Water Conservation and the PDMS Preferred Embodiment

The PDMS preferred embodiment can be used to alert the water utility to wasteful water practices produced by their customers. The PDMS can be programmed to alert for ongoing high flow sceneries, such as filling a swimming pool or prolonged sprinkler use. The wasteful water practices described could then be followed up with a phone call, or letter of warning in the customer's water utility bill. Additional income to the utility could also be created when these practices are identified, as using water in violation of rules set in place by state or local officials can be cause for an increase in billing.

Options for Communicating with Off Property Parties and Remote Operation (PDMS Alternate Embodiment):

The PDMS alternate embodiment can communicate through a 3G connection from the user interface. It can transmit water flow information to off property individuals, such as a property manager, landlord or property owner. Additionally it gives the user the ability to control the PDMS interface through the PDMS internet application. The transmissions can come in the form of an email alert, or read directly from the PDMS application, advising the responsible property of a water discrepancy. Information that can be relayed and actions that can be taken are as follows.

Actions:
1) Activation of the Home mode
2) Activation of the Away mode
3) Activation of the PDMS alternate embodiment Water Off mode Information Transmitted:
1) Standard Use Leak alarm
2) Small Leak water alarm
3) Recorded Small Leak alarm
4) Wasteful Water Alert—If too much water used in a single day the PDMS alternate embodiment can be programmed to send an alert, advising the responsible party of the wasteful water situation.

The foregoing has outlined rather broadly the more pertinent and important features of the present Positive Displacement Metering Systems in order that the detailed description of the application that follows may be better understood. This would allow the present contribution to the art to be more fully appreciated. Additional features of the design will be described hereinafter which form the subject of the claims of this disclosure. It should be appreciated by those skilled in the art that the conception and the disclosed specific embodiment may be readily utilized as a basis for modifying or designing other structures and methods for carrying out the same purposes of the present design. It should also be realized by those skilled in the art that such equivalent constructions and methods do not depart from the spirit and scope of this application as set forth in the appended claims.

BRIEF DESCRIPTION OF THE DRAWINGS

The accompanying drawings, which are incorporated in and form a part of this specification, illustrate embodiments of the preferred and alternate embodiments of the Positive Displacement Metering Systems and together with the description, serve to explain the principles of this application.

FIG. 10 depicts the PDMS systems Sequence of Events-1 chart regarding piston position, valve position, and water meter and water flow actions.

FIG. 11 depicts the PDMS in the systems Sequence of Events-2 chart regarding piston position, valve position, water meter and water flow actions.

FIG. 12 depicts the PDMS in systems Sequence of Events-3 chart regarding piston 32 position, primary valve position, water meter and water flow actions.

FIG. 13 depicts the PDMS in systems Sequence of Events-4 chart regarding piston position, primary valve position, and water meter and water flow actions.

For a fuller understanding of the nature and advantages of the PDMS in the preferred or alternate embodiment systems, reference the following detailed description taken in conjunction with the accompanying drawings which are incorporated in and form a part of this specification, illustrate embodiments of the designs and together with the description, serve to explain the principles of this application.

DETAILED DESCRIPTION OF THE PREFERRED EMBODIMENTS

Figure 1:
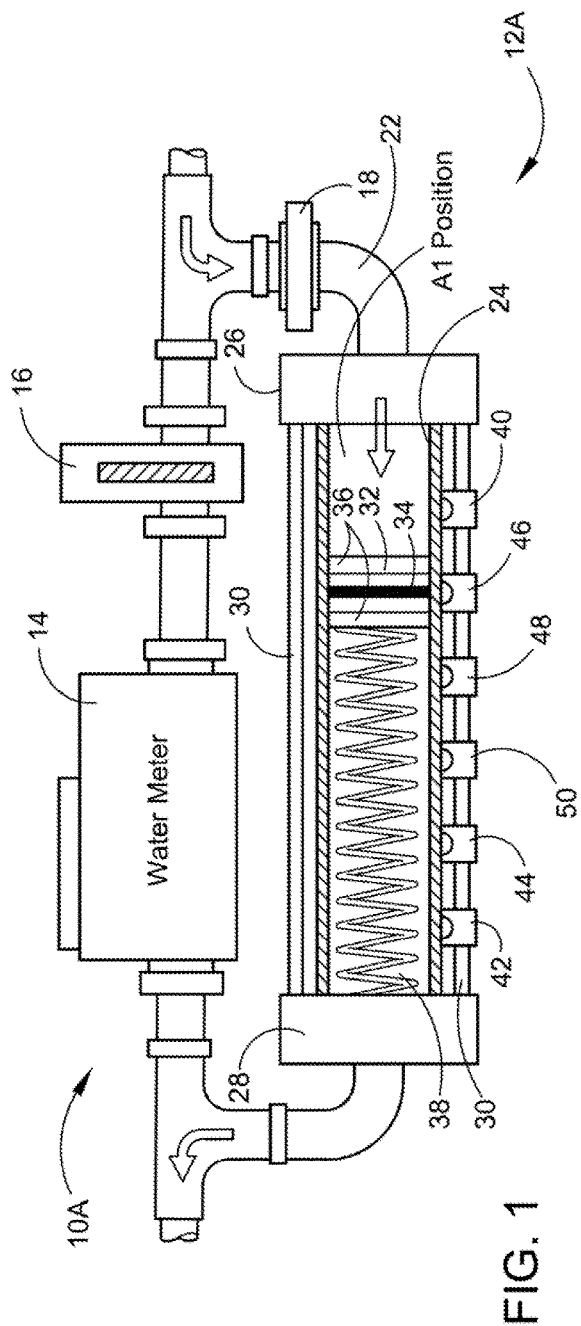
FIG. 1 depicts an illustration of the water fill cylinder, water meter and the primary valve of the PDMS preferred embodiment.

Referring now to the drawings, wherein similar parts of the PDMS in the preferred or alternate embodiments 10A, 10B, 10C, 10D and 10E that are identified by like reference numerals, there is seen in FIG. 1 the PDMS preferred embodiment 10A consisting of the Water Fill Cylinder Assembly (WFC) 12A, water meter 14 and the primary valve 16. A replaceable particulate screen 18 is located on the intake line 22 before the Water Fill Cylinder Assembly (WFC) 12A. Alternate WFC's will also be described below as 12B, 12C and 12D.

FIG. 1 depicts an illustration of the water fill cylinder, water meter and the primary valve of the PDMS preferred embodiment. The Water Fill Cylinder Assembly (WFC) 12A of PDMS preferred embodiment 10A, consists of a cylinder 24 with two end caps 26 and 28 being held together by the means of four tie rods 30. The piston 32 has a center groove containing a circular magnet 34 made of a pliable substance which allows it to fit into a groove to be stretched and fit around the piston 32. Seals 36 are on either side of the piston 32 with a compression spring 38 between the piston 32 and the end cap 28. S1 sensor 40, S2 sensor 42 and OR1 sensor 44 are located along the tie rod 30 and their location may be moved to adjust the sensitivity of the system. The A1 Position indicates the starting point of the piston 32 within the cylinder 24.

The PDMS preferred embodiment 10A has additional sensors added to the Water Fill Cylinder Assembly (WFC) 12A, these sensors are placed along the tie rod 30 at a distance of roughly 1 inch apart and are referred to as WM 1 sensor 46, WM 2 sensor 48 and WM 3 sensor 50. T1 time is evaluated each time the piston passes WM 1 sensor 46, WM 2 sensor 48 and WM 3 sensor 50. This time is compiled, totalized and recorded by the data acquisition unit (DAU) along with the cycle count. At no time does water flow through the Water Fill Cylinder Assembly (WFC) 12A.

Figure 2:
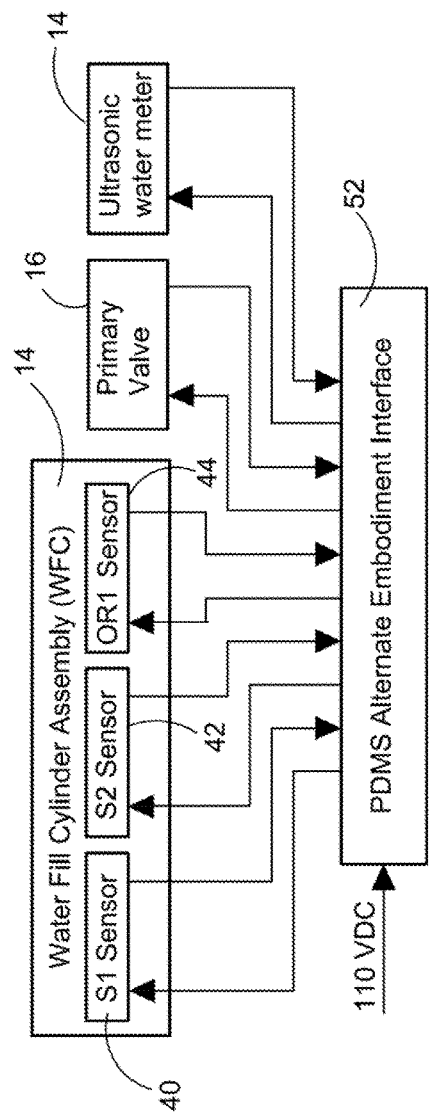
FIG. 2 depicts a simplified block diagram of a direct wired PDMS alternate embodiment Leak Alarm System.

FIG. 2 depicts a simplified block diagram of a direct wired PDMS alternate embodiment system 10B. The PDMS alternate embodiment system 10B receives 120 VDC power to the PDMS Alternate Embodiment interface 52 and directs it to the Water Fill Cylinder Assembly (WFC) 12B along with the primary valve 16 and the water meter 14. S1 sensor 40, S2 sensor 42 and OR1 sensor 44 are an integral part of the Water Fill Cylinder Assembly (WFC) 14. It must be made clear at this time that the Positive Displacement Metering System 10B can additionally function as a battery powered and or wireless system.

Figure 3:
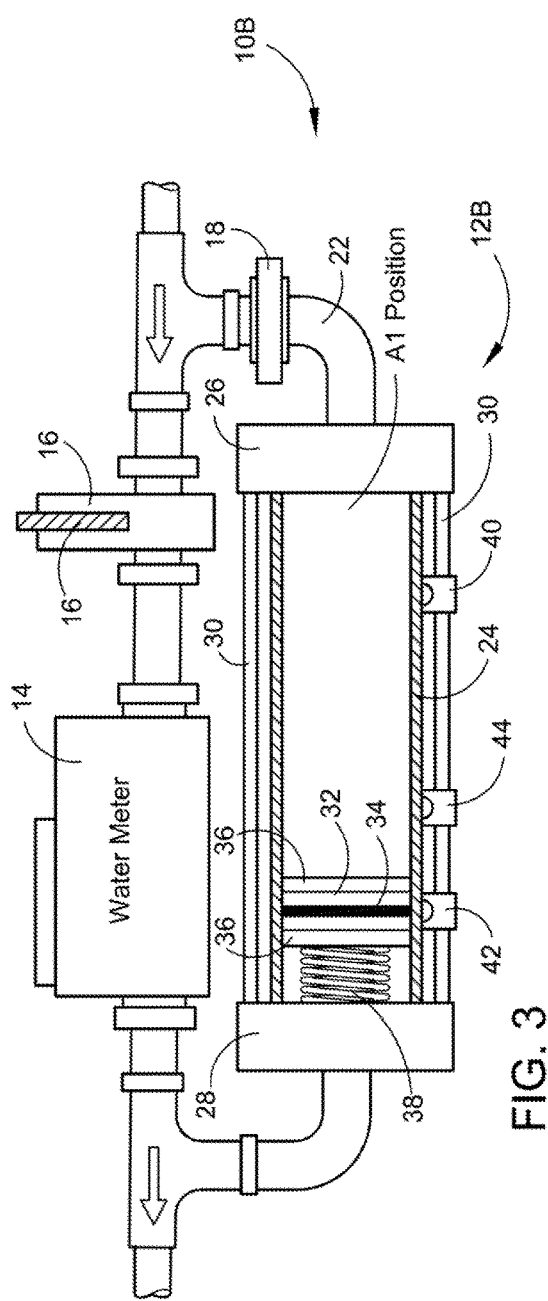
FIG. 3 depicts an illustration of the water fill cylinder assembly of the PDMS alternate embodiment system, water meter and the primary valve in the Standard Use Mode with the Evaluation Mode ended.

FIG. 3 depicts an illustration of the water fill cylinder assembly 12B of the PDMS alternate embodiment system 10B, water meter 14 and the primary valve 16 in the Standard Use Mode with the Evaluation Mode ended. Cylinder 24 with two end caps 26 and 28 is being held together by the means of four tie rods 30. The piston 32 has a center groove containing a circular magnet 34 made of a pliable substance which allows it to fit into a groove to be stretched and fit around the piston 32. Seals 36 are on either side of the piston 32 with a compression spring 38 between the piston 32 and the end cap 28. S1 sensor 40, S2 sensor 42 and OR1 sensor 44 are located along the tie rod 30 and their location may be moved to adjust the sensitivity of the system. The A1 Position indicates the starting point of the piston 32 within the cylinder 24. In the Evaluation mode, the piston 32 reaches sensor 42 (S2), T1 time was evaluated and appropriate logic was assigned. Example: T1 time equals a value less than X (30 seconds) indicating Standard Use. Standard Use logic opens the primary valve 16. The piston 32 position is now controlled by the Water Meter 14 flow rate. T2 time begins, alarm will trigger in accordance with Home or Away mode time.

Figure 4:
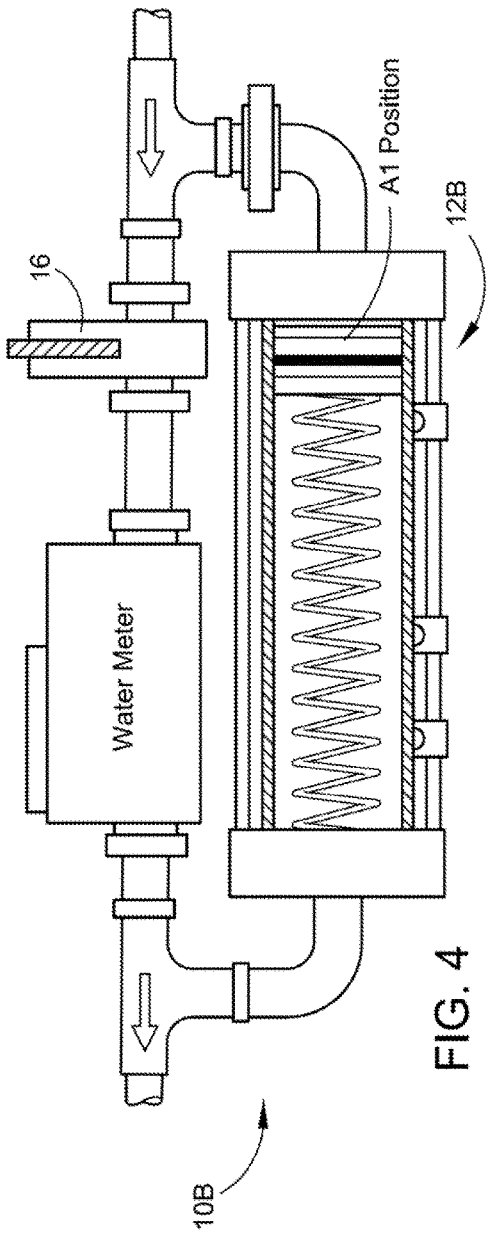
FIG. 4 depicts an illustration of the water fill cylinder, water meter and the primary valve of the PDMS alternate embodiment system.

FIG. 4 depicts an illustration of the water fill cylinder 12B, water meter 14 and the primary valve 16 of the PDMS alternate embodiment system 10B. As depicted, the Evaluation mode recorded a T1 time less than X, signaling Standard Use logic. The primary valve 16 opened, T2 time started and the piston 32 returned to A1.

Figure 5:
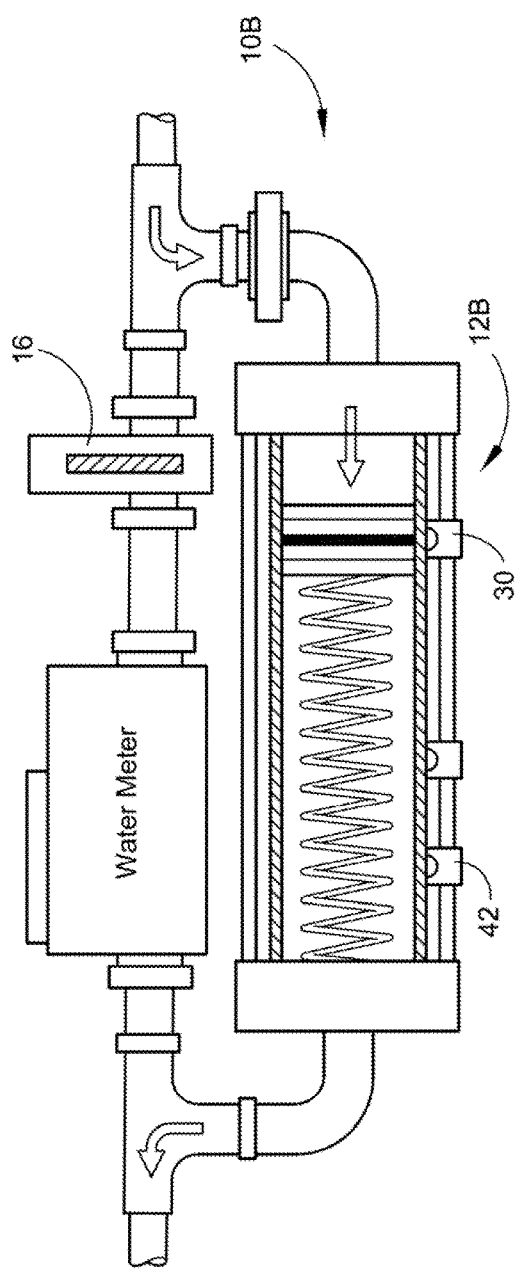
FIG. 5 depicts an illustration of the water fill cylinder, water meter and the primary valve of the PDMS alternate embodiment system.

FIG. 5 depicts an illustration of the water fill cylinder 12B, water meter 14 and the primary valve 16 of the PDMS alternate embodiment system 10B. As depicted the Evaluation Mode is active, the piston 32 passes 40 (S1) and begins T1 time, once the piston 32 reaches sensor 42 (S2), T1 time will end and the appropriate logic will be assigned.

Figure 6:
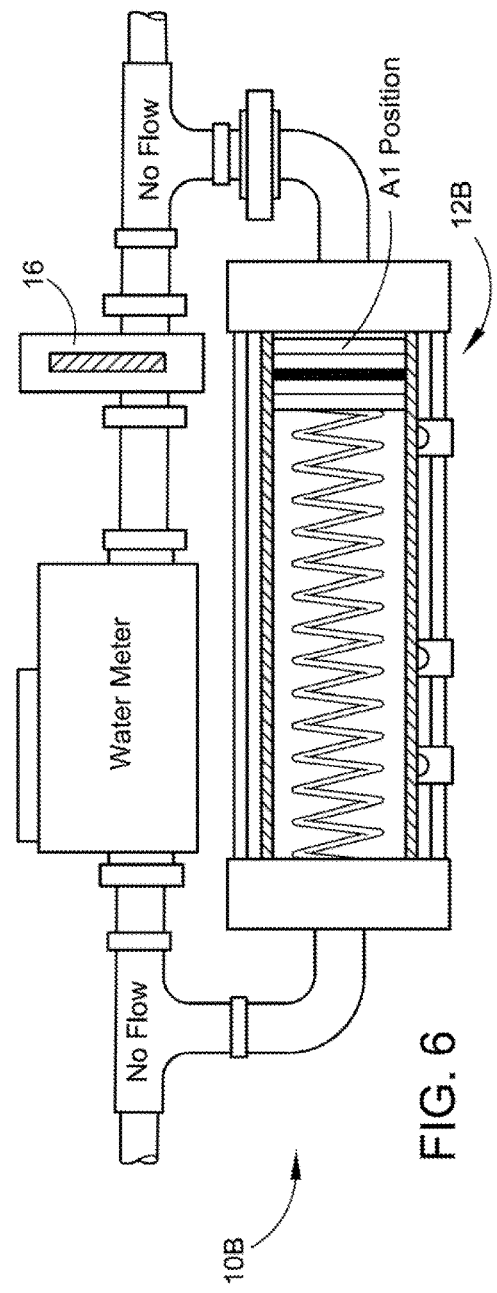
FIG. 6 depicts an illustration of the water fill cylinder 12B, water meter 14 and the primary valve 16 of the PDMS alternate embodiment system 10B.

FIG. 6 depicts an illustration of the water fill cylinder 12B, water meter 14 and the primary valve 16 of the PDMS alternate embodiment system 10B. Evaluation Mode the piston 32 is in the A1 Home position.

Figure 7:
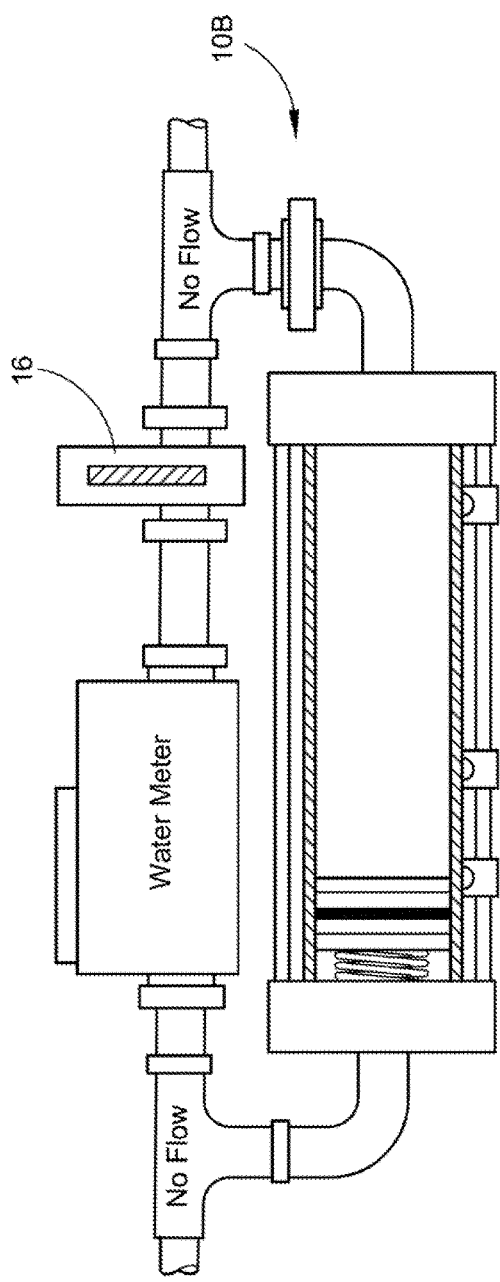
FIG. 7 depicts an illustration of water fill cylinder, water meter and the primary valve of the PDMS alternate embodiment system in the Leak Alarm Mode.

FIG. 7 depicts an illustration of the water fill cylinder 12B, water meter 14 and the primary valve 16 of the PDMS alternate embodiment system 10B, in the Leak Alarm Mode. Alarm logic has triggered. In Standard Use the Home or Away Mode times may have been exceeded. In Slow Leak logic, or Recorded Leak logic, the total cycle count may have been exceeded, producing an alarm condition. In this state, the primary valve 16 closes, forcing the piston 32 to the end of the WFC 12B. Water is shut off to the property and the responsible party notified.

Figure 8:
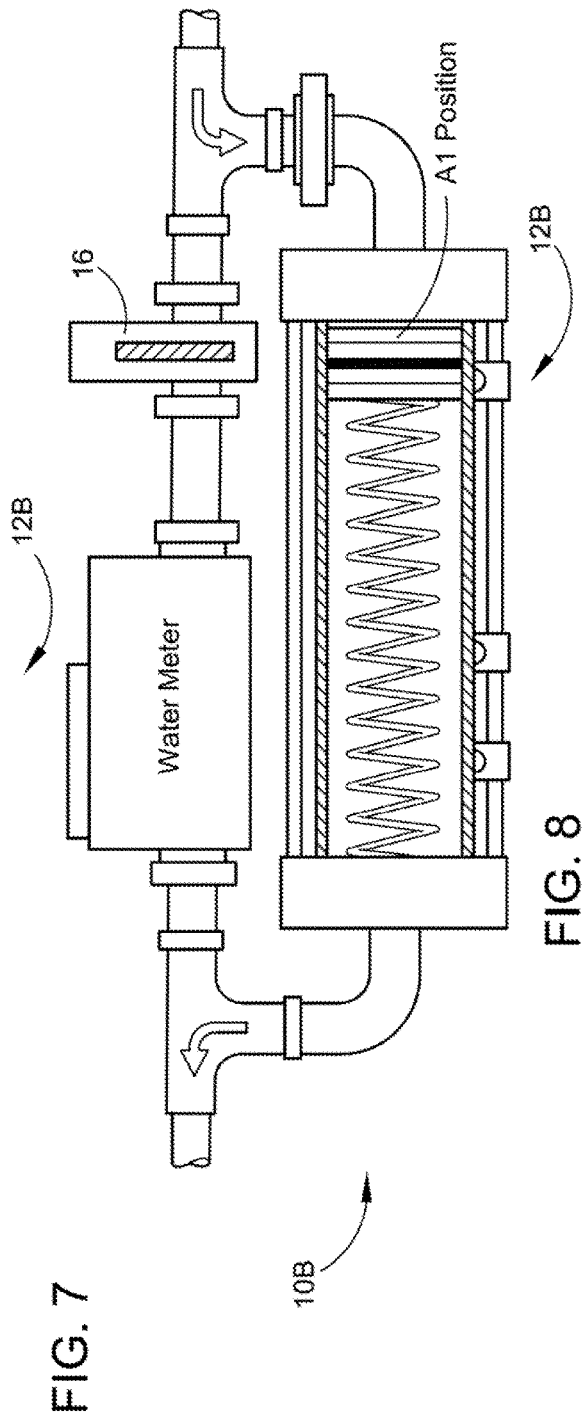
FIG. 8 depicts an illustration of the water fill cylinder, water meter and the primary valve of the PDMS alternate embodiment system in the Small Leak Logic (cycle 1).

FIG. 8 depicts an illustration of the water fill cylinder 12B, water meter 14 and the primary valve 16 of the PDMS alternate embodiment system 10B in the Small Leak Logic (cycle 1). Evaluation Mode ended and produced a T1 time of more than 30 seconds, but less than 24 minutes. This triggered Small Leak logic. The primary valve 16 opened for 5 seconds, allowing the piston 32 to return to A1 position. One cycle was counted. At the end of 5 seconds, the primary valve 16 closed, forcing water into the water fill cylinder 12B. At sensor 40 S1, T1 time will begin and the cycle will repeat. On the third cycle the system will alarm.

Figure 9:
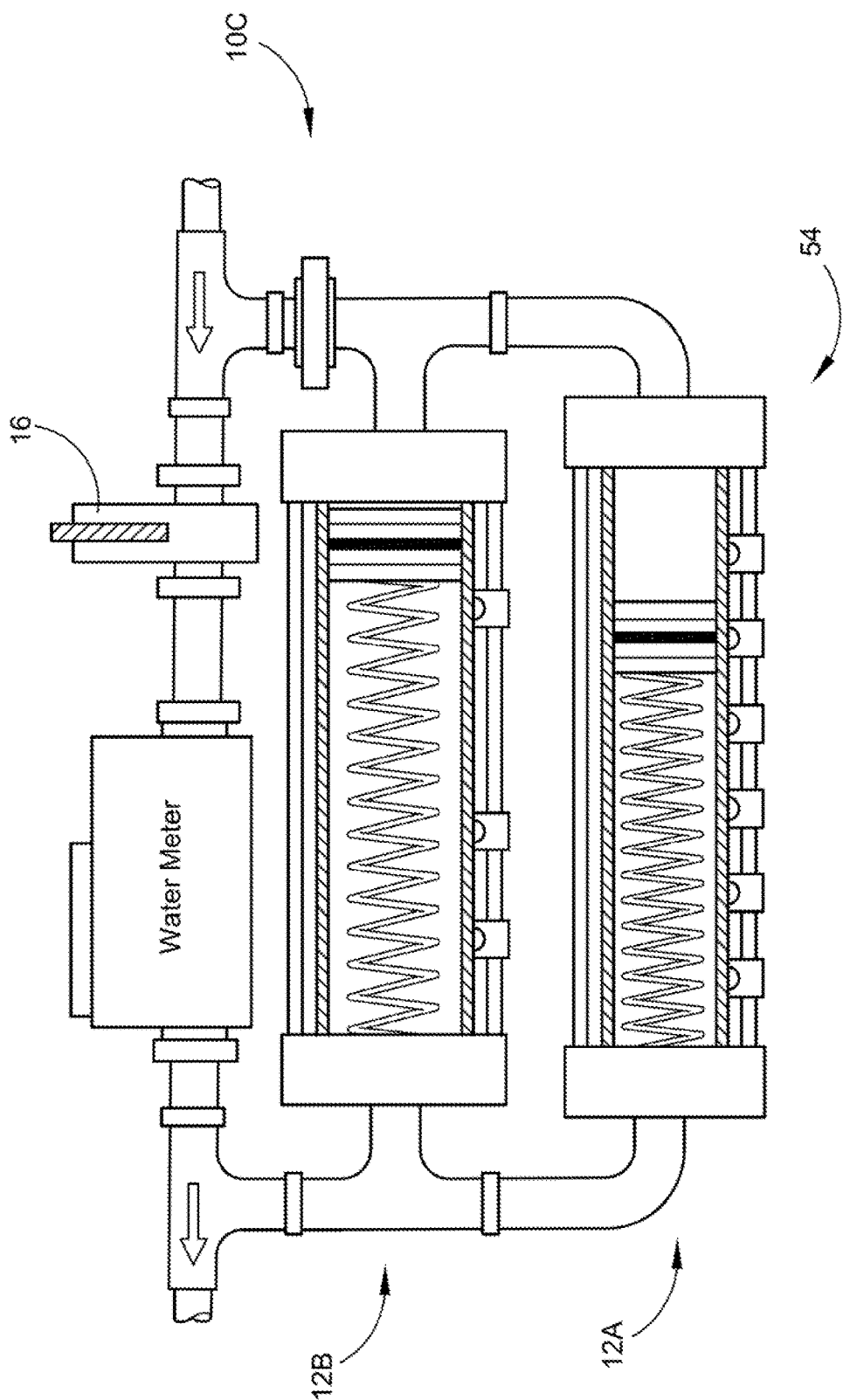
FIG. 9 depicts the PDMS in the second alternate embodiment system illustrating a redundant, multi-water fill cylinder configuration.

FIG. 9 depicts the PDMS in the preferred or second alternate embodiment 10C illustrating the 10A and 10B systems in the redundant, multi-water fill cylinder 54. The dual water fill cylinders 12A and water fill cylinders 12B arrangement represents one possible variation of multiple cylinders, and cylinders of various diameters would be the added reliability of a redundant system, plus a larger diameter cylinder is best for high flow rates, while a smaller diameter cylinder is best for accuracy. A combination of the two would create a very accurate and reliable system. The duel WFC rendering is one possible variant of a PDMS system using multiple Water Fill Cylinders. The advantage of multiple cylinders would be the added reliability of a more redundant system. Additionally, cylinders of various diameters would have another advantage:

A larger diameter cylinder is best for higher flow rates.

A smaller diameter cylinder produces a more accurate reading at lower flow rates. The combination of two different diameter cylinders could be used to produce a very accurate system in conjunction with a higher flow rate.

FIG. 10 depicts the PDMS in the preferred or alternate embodiment systems 12A or 12B Sequence of Events-1 chart regarding piston 32 position, valve position, water meter and water flow actions.

FIG. 11 depicts the PDMS in 12A, 12B or 12C systems Sequence of Events-2 chart regarding piston 32 position, primary valve 16 position, water meter 14 and water flow actions.

FIG. 12 depicts the PDMS in 12A, 12B or 12C systems Sequence of Events-3 chart regarding piston 32 position, primary valve 16 position, water meter 14 and water flow actions.

FIG. 13 depicts the PDMS in 12A, 12B or 12C systems Sequence of Events-4 chart regarding piston 32 position, primary valve 16 position, water meter and water 14 flow actions.

Figure 14A:
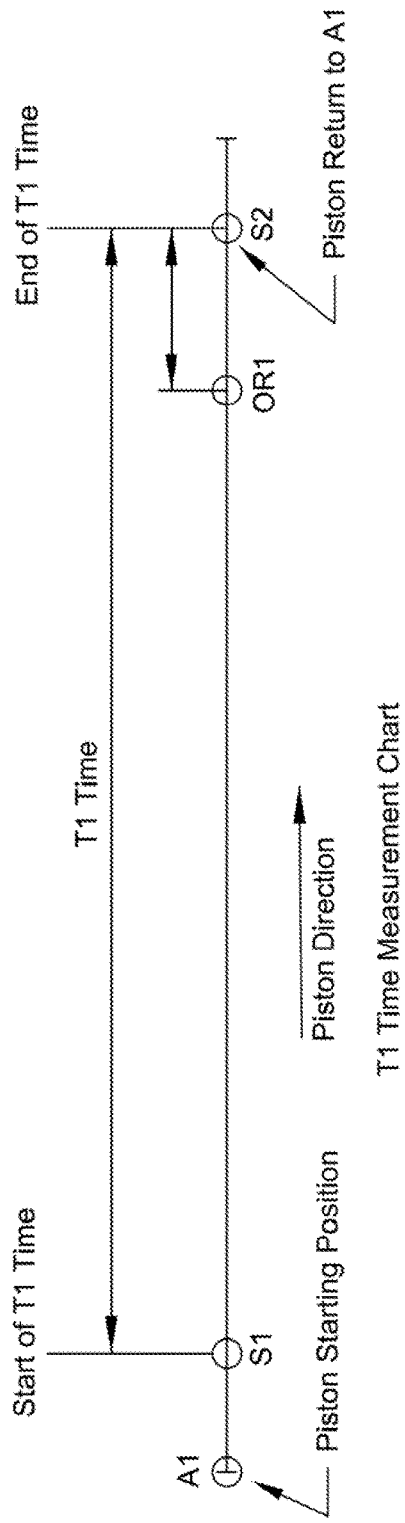
FIG. 14A and FIG. 14B depict a Positive Displacement Metering systems logic graph illustrating an example of how T1 time is measured and subsequently how T1 time is used to assign the appropriate logic sequence.
Figure 14B:
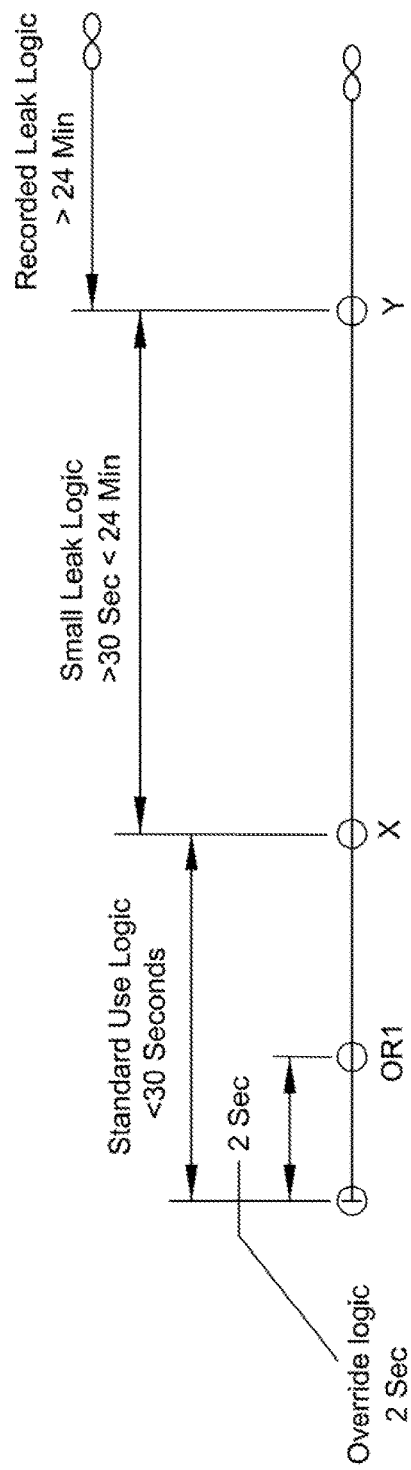

FIGS. 14A and 14B depict a Positive Displacement Metering System preferred or alternate embodiment, systems 12A, 12B, 12C and 12D logic chart. The chart illustrates an example of how T1 time is measured and subsequently, how T1 time is then used to assign the appropriate logic sequence. In this regard, FIG. 14A represents a timing event associated with the movement of piston 32. When the piston is in motion, it is timed between S1 and S2. The amount of time it takes the piston to travel between these two points is T1 time. FIG. 14B represents what logic sequence will be assigned to a particular water event associated with the previous measurement of T1 time (as deduced from FIG. 14A). Where T1 time falls on the time line, corresponds to the logic assigned. Please refer to the following definitions when referencing the charts found in FIG. 14A and FIG. 14B:

T1—The amount of time it takes the piston to travel from S1 to S2. The higher the amount of time between S1 and S2, the slower the rate of flow.

T2—The total amount of time the PV is open. It begins when Standard Use flow is assigned and the PV opens. It is used to time the Home and Away modes.

X—The division point, measured in T1 time, between Standard Use flow and Small Leak flow. A T1 time value less than X will open the PV and begin T2 time (Standard Use logic), a T1 value greater than X (but less than Y) will assign Small Leak logic.

Y—The division point, measured in T1 time, between Small Leak logic and Recorded Leak logic OR1—Override Sensor 1. OR1 activates when the PDMS is measuring a leak, and the piston is moving very slowly. Should a valve open while the piston is measuring a leak, a false T1 time will be produced. The OR1 sensor eliminates this problem by measuring the time it takes the piston to travel from OR1 to S2. If this time is less than 2 seconds, OR1 logic will override T1 time, and Standard Use logic will be assigned (PV open, T2 time starts)

A1—The piston home position

S1—Sensor 1, when the piston passes S1, T1 time begins.

S2—Sensor 2, when the piston reaches S2, T1 time ends.

FIGS. 14A and 14B use the following values:

X is equal to 30 seconds

Y is equal to 24 minutes

OR1 is equal to 2 seconds or less

EXAMPLE 1

A Leaking Faucet Inside the Property being Monitored

With reference to FIG. 14A, as soon as the leak begins, Piston 32 will move away from the A1 position. The water in front of the piston is feeding the leak. When the piston reaches S1, a timer begins, this is the start of T1 time. 15 minutes later, Piston 32, reaches S2, and T1 time stops. T1 time is now equal to 15 minutes. With reference to FIG. 14B, note that the T1 time of 15 minutes falls between the X value of 30 seconds and the Y value of 24 minutes. Therefore Small Leak logic will be assigned to this water event.

EXAMPLE 2

A Faucet Inside the Property being Monitored is Opened

With reference to FIG. 14A, as soon as the faucet is opened and water begins flowing, Piston 32 immediately moves off of A1. When the piston reaches S1, T1 time begins, 6 seconds pass and the piston reaches S2. T1 time is now equal to 6 seconds. With reference to FIG. 14B, note that the T1 time of 6 seconds is less than the value of X, 30 seconds. Therefore Standard Use logic will be assigned to this water event. At this point, the PV will open, and T2 time will begin.

EXAMPLE 3

A Leaking Faucet Inside the Property being Monitored is Opened

With reference to FIG. 14A, as soon as the leak begins, Piston 32 will move away from the A1 position. The water in front of the piston is feeding the leak. When the piston reaches S1, T1 time will begin. 5 minutes pass and the piston is halfway between S1 and S2, at this point, the leaking faucet is opened, and the piston immediately moves from its present position to S2 and produces a T1 time of 5 minutes and 3 seconds. With reference to FIG. 14B, notice that a T1 time of 5 min 3 seconds falls inside of the Small Leak logic sequence, but we know this is incorrect, as the leaking faucet was opened, hence Standard Use logic must apply. When we look at the OR1 sensor, we see that it measured a time value less than 2 seconds, and therefore, the T1 time value of 5 min and 3 seconds will be overridden by OR1 time. Now Standard Use logic will be assigned to this water event, rather than Small Leak logic, as OR1 time was under 2 seconds.

Figure 15:
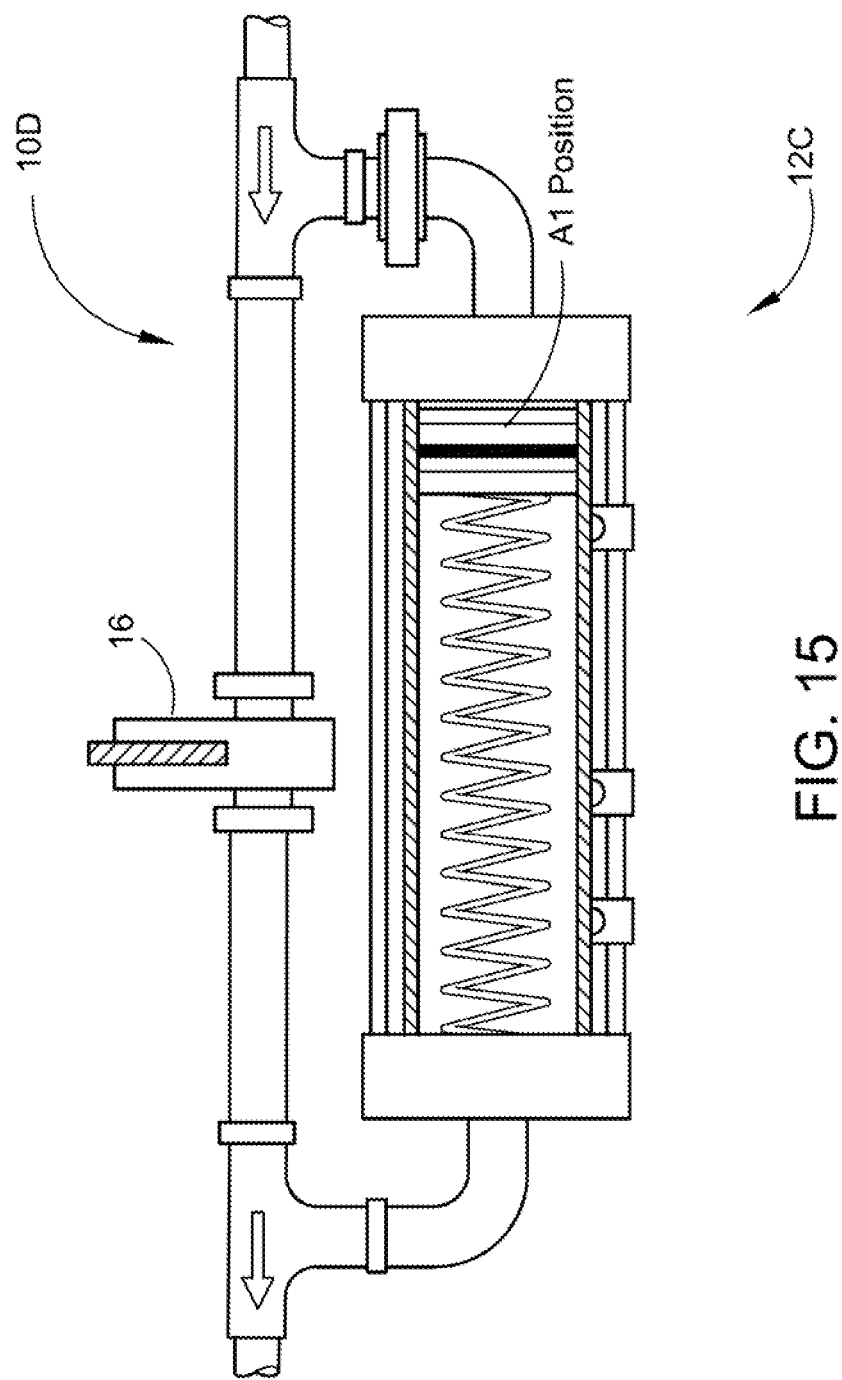
FIG. 15 depicts the third alternate embodiment as a variation of the PDMS second alternate embodiment without a water meter.

FIG. 15 depicts the third alternate embodiment 10D as a variation of the PDMS second alternate embodiment 12C without a water meter. In this configuration, the PDMS is only used as a leak detection system. Sensors 40 S1, 42 S2 and 44 OR1 function in the same manner as the preferred embodiment 10A and alternate embodiments 10B, 10C. When the PDMS detects Standard Use flow, the primary valve 16 opens for a predetermined length of time, typically this would be 10 minutes. At the expiration of that time, 16 will close and water flow will be re-evaluated. Should T1 still be less than X, then 16 will reopen and Standard Use water flow will continue. If T1 is greater than X, the appropriate leak logic would be assigned, or the system would return to the Evaluation Mode.

Figure 16:
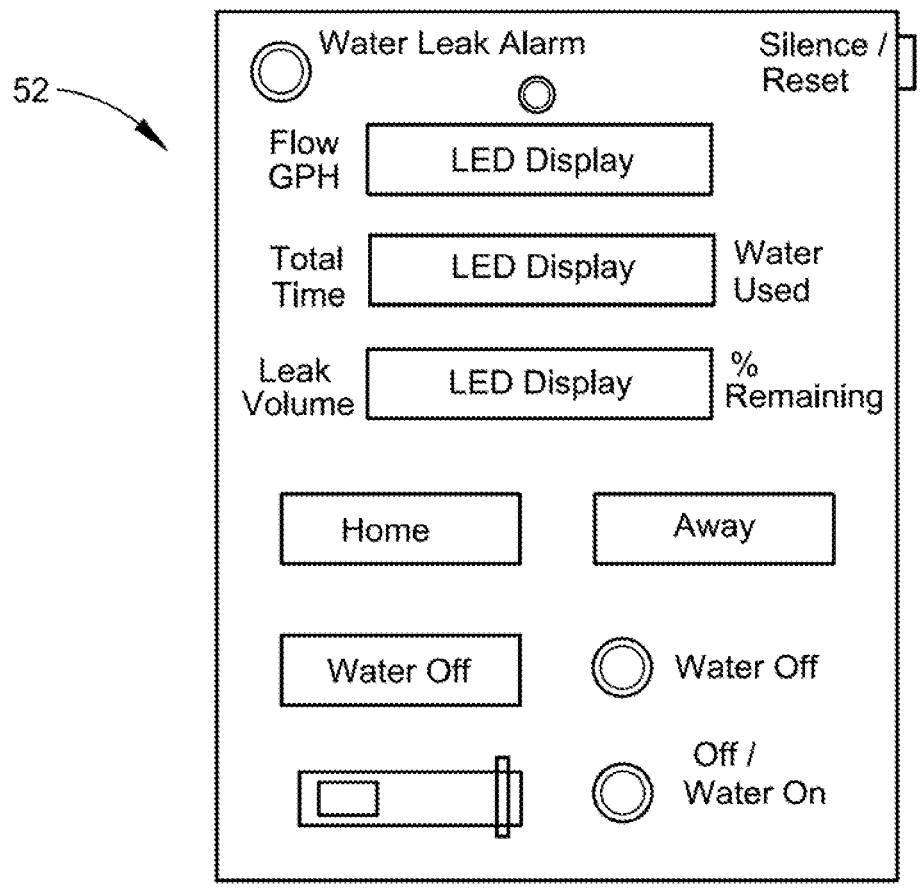
FIG. 16 depicts an illustration of the PDMS alternate embodiment systems Interface front user control panel.

FIG. 16 depicts an illustration of the PDMS Interface front panel 52.

Figure 17:
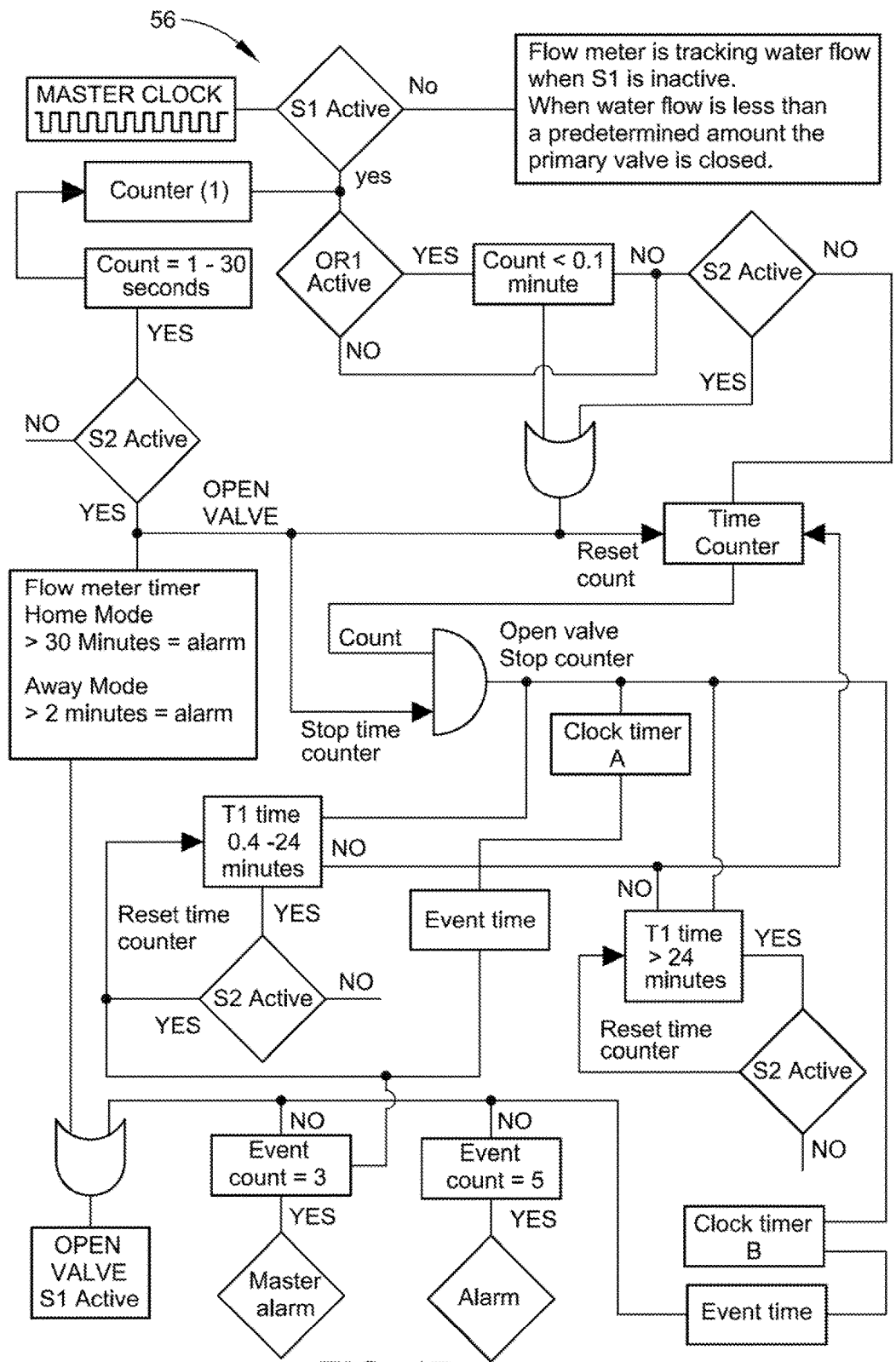
FIG. 17 depicts an interactive pert chart of the PDMS preferred or alternate embodiment systems.

FIG. 17 depicts an interactive pert chart 54 of the PDMS systems 12A, 12B or 12C.

Figure 18:
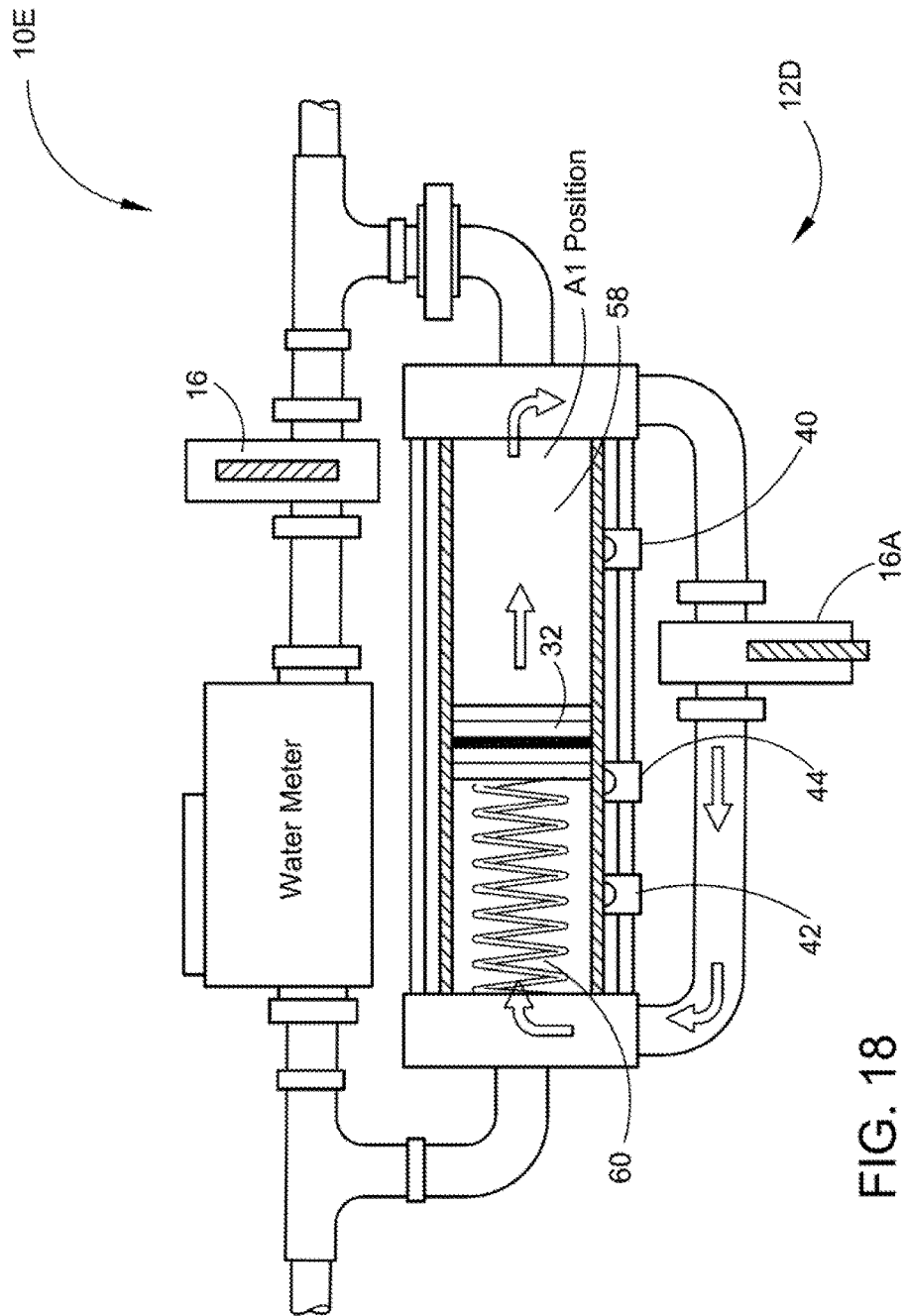
FIG. 18 depicts the piston moving from sensor to sensor when the area is slowly flooded.

FIG. 18 depicts an alternate WFC 12D wherein piston 32 is returning to its home position A1. the water which occupies the area 58 is flowing through an alternate route. Alternate embodiment 12D allows the volume of water in area 58 to reposition to area 60, without transitioning past the water meter. The secondary valve (SV) 16A will open when T1 time has been assigned a value of X or greater. If T1 time is less than the value of X, Standard Use flow logic will be assigned, and the PV 16 will open. Also note that the primary valve (PV) 16 and the secondary valve 16A, will never both be open at the same time.

The Positive Displacement Metering Systems 12A, 12B, 12C and 12D shown in the drawings and described in detail herein disclose arrangements of elements of particular construction and configuration for illustrating preferred embodiments of structure and method of operation of the present application. It is to be understood, however again, that elements of different construction and configuration and other arrangements thereof, other than those illustrated and described may be employed for providing a Positive Displacement Metering System 12A, 12B, 12C and 12D in accordance with the spirit of this disclosure, and such changes, alternations and modifications as would occur to those skilled in the art are considered to be within the scope of this design as broadly defined in the appended claims.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

We claim:

1. A positive displacement metering system comprising:
   a) a water fill cylinder assembly, a water meter, and a primary valve, wherein when said primary valve is closed, water is diverted to said water fill cylinder assembly, and when said primary valve is open, water freely flows through said water meter to a property being monitored;
   b) said water fill cylinder assembly having a piston and a spring located within said cylinder assembly;
   c) said piston having a magnet thereon, located within said water fill cylinder assembly;
   d) two or more sensors mounted on said cylinder assembly;
   wherein water flows into said cylinder assembly and moves said piston, compressing said spring, whereby said two or more sensors detect a position of said magnet on said piston with respect to said water fill cylinder assembly and a timing of a movement of said piston, and thereby measures a true displacement volume and rate of flow;
   wherein said water fill cylinder assembly and said two or more sensors are connected to and in communication with a data acquisition unit and a control panel, whereby said data acquisition unit uses acquired timing data to determine rate of flow; and
   wherein said data acquisition unit and the control panel is in communication with said two or more sensors and can switch between standard operation logic and small leak detection logic.

2. The positive displacement metering system according to claim 1, wherein a bypass is installed on said primary valve.

3. The positive displacement metering system according to claim 2, wherein said bypass includes a secondary valve.

4. The positive displacement metering system according to claim 1, wherein a particulate screen is positioned between a water source line coming in to the property being monitored and said water fill cylinder assembly.

5. A positive displacement metering system comprising:
   a) a water fill cylinder assembly, a water meter, and a primary valve, wherein when said primary valve is closed, water is diverted to said water fill cylinder assembly, and when said primary valve is open, water freely flows through said water meter to a property being monitored;
   b) said water fill cylinder assembly having a piston and a spring located within said cylinder assembly;
   c) said piston having a magnet thereon, located within said water fill cylinder assembly;
   d) two or more sensors mounted on said cylinder assembly;
   wherein water flows into said cylinder assembly and moves said piston, compressing said spring, whereby said two or more sensors detect a position of said magnet on said piston with respect to said water fill cylinder assembly and a timing of a movement of said piston, and thereby measures a true displacement volume and rate of flow; and
   wherein said two or more sensors includes three sensors including an override sensor, and thereby times the movement of said piston for measuring the true displacement volume and rate of flow.

6. A method for making a positive displacement metering system comprising:
   a) providing a water fill cylinder assembly, a water meter, and a primary valve, wherein when said primary valve is closed, water is diverted to said water fill cylinder assembly, and when said primary valve is open, water freely flows through said water meter to a property being monitored;

b) providing a piston having a magnet thereon, located within said water fill cylinder assembly;

c) providing two or more sensors mounted on said cylinder assembly;

wherein water flows into said cylinder assembly and moves said piston, compressing said spring, whereby said two or more sensors detect a position of said magnet on said piston and a timing of a movement of said piston, and thereby measures a true displacement volume and rate of flow;

wherein said water fill cylinder assembly and said two or more sensors are connected to and in communication with a data acquisition unit and a control panel, whereby said data acquisition unit uses acquired timing data to determine rate of flow; and wherein said data acquisition unit and the control panel is in communication with said two or more sensors and can switch between standard operation logic and small leak detection logic.

7. The method of making a positive displacement metering system according to claim 6, wherein a bypass is installed on said primary valve.

8. The method of making a positive displacement metering system according to claim 7, wherein said bypass includes a secondary valve.

9. A method for making a positive displacement metering system comprising:

a) providing a water fill cylinder assembly, a water meter, and a primary valve, wherein when said primary valve is closed, water is diverted to said water fill cylinder assembly, and when said primary valve is open, water freely flows through said water meter to a property being monitored;

b) providing a piston having a magnet thereon, located within said water fill cylinder assembly;

c) providing two or more sensors mounted on said cylinder assembly;

wherein water flows into said cylinder assembly and moves said piston, compressing said spring, whereby said two or more sensors detect a position of said magnet on said piston and a timing of a movement of said piston, and thereby measure a true displacement volume and rate of flow; and wherein said two or more sensors includes three sensors including an override sensor, and thereby times the movement of said piston for measuring the true displacement volume and rate of flow.

* * * * *